June 22, 1943.  O. STEINER  2,322,733

SHUTTER MECHANISM FOR PHOTOGRAPHIC CAMERAS

Filed Dec. 3, 1940  9 Sheets-Sheet 1

INVENTOR.
Oscar Steiner:
BY
Attys.

June 22, 1943.  O. STEINER  2,322,733
SHUTTER MECHANISM FOR PHOTOGRAPHIC CAMERAS
Filed Dec. 3, 1940  9 Sheets-Sheet 2
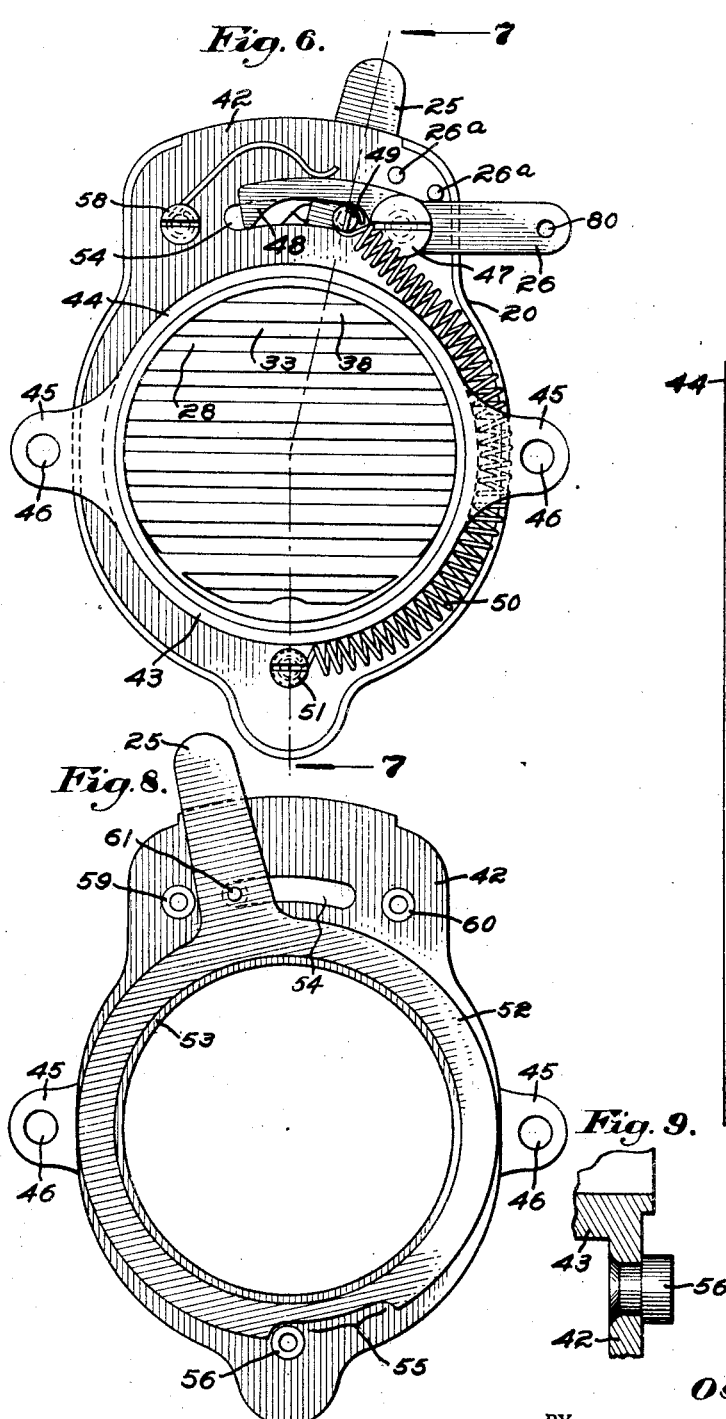
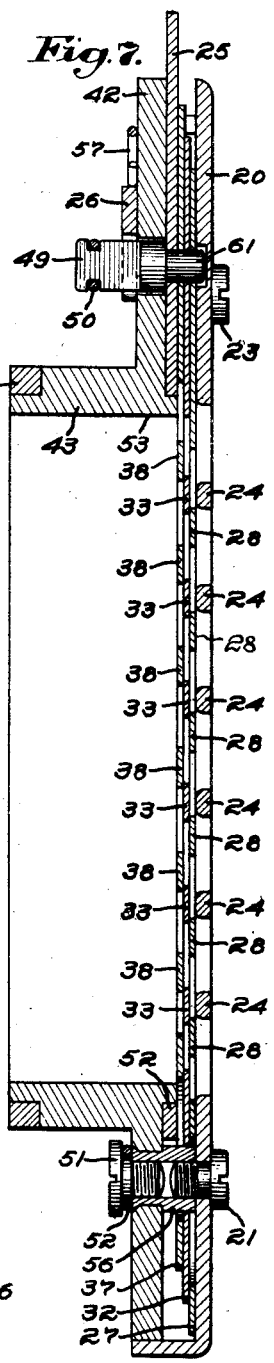
INVENTOR.
Oscar Steiner:
BY
Attys.

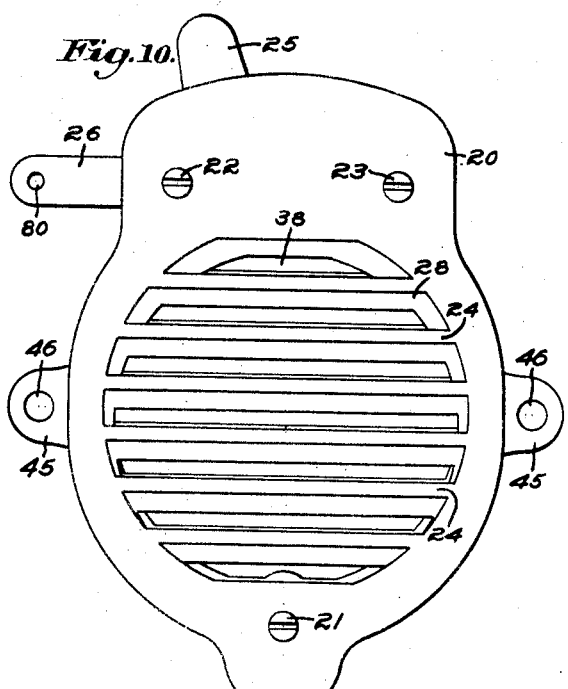
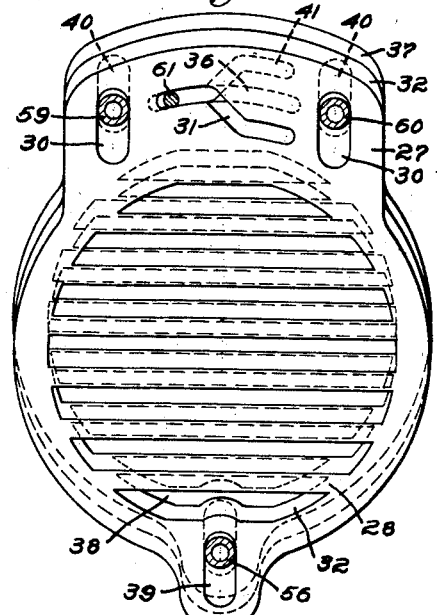
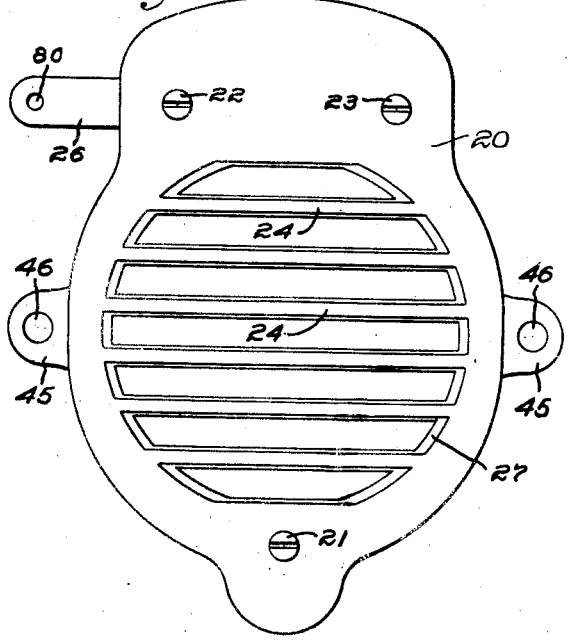
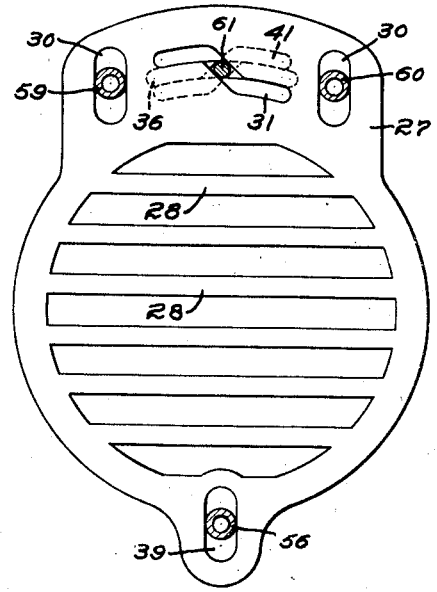

June 22, 1943.  O. STEINER  2,322,733
SHUTTER MECHANISM FOR PHOTOGRAPHIC CAMERAS
Filed Dec. 3, 1940  9 Sheets-Sheet 4
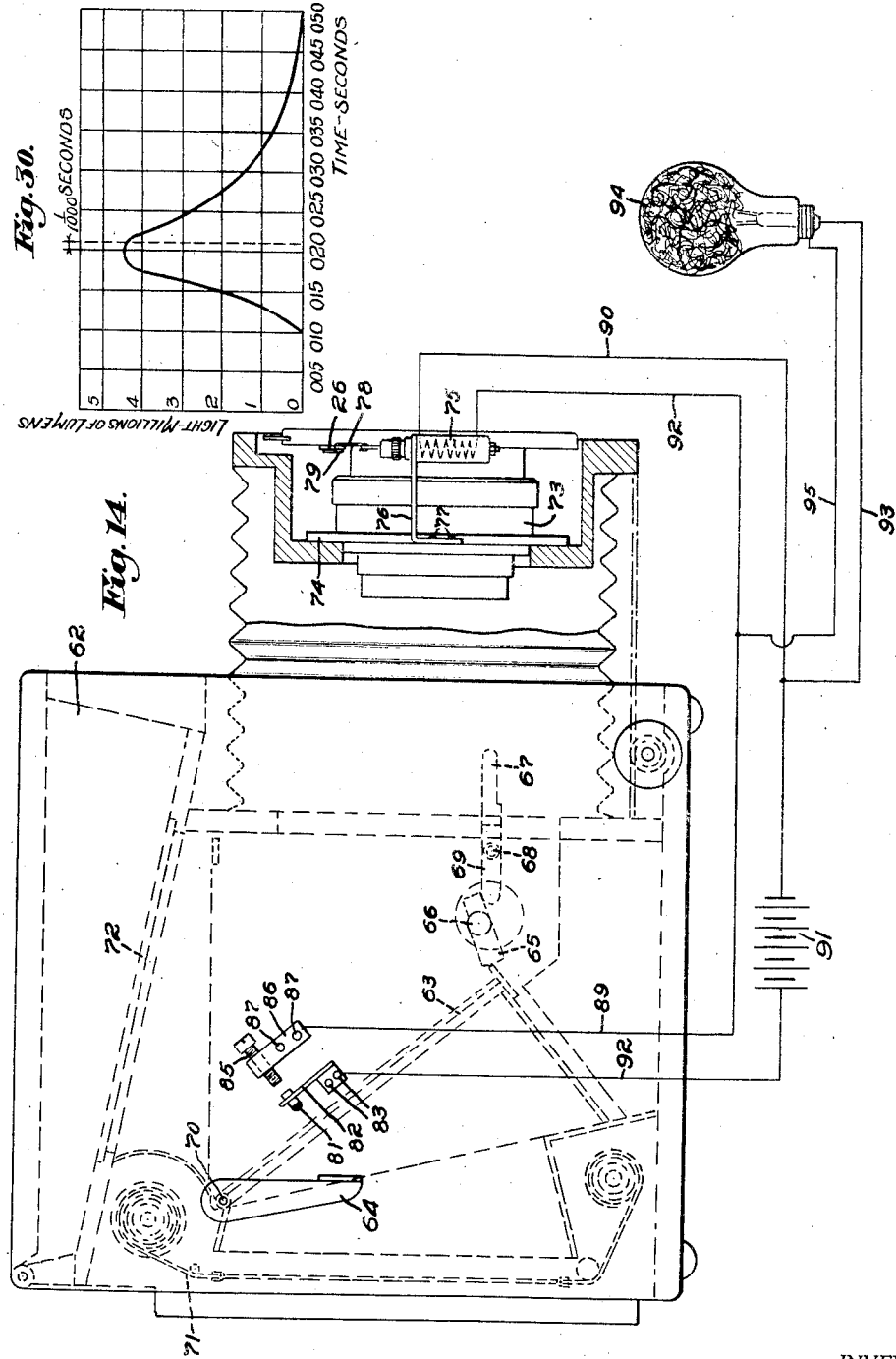
INVENTOR.
Oscar Steiner
BY
Attys.

June 22, 1943.　　　　O. STEINER　　　　2,322,733
SHUTTER MECHANISM FOR PHOTOGRAPHIC CAMERAS
Filed Dec. 3, 1940　　　　9 Sheets-Sheet 5
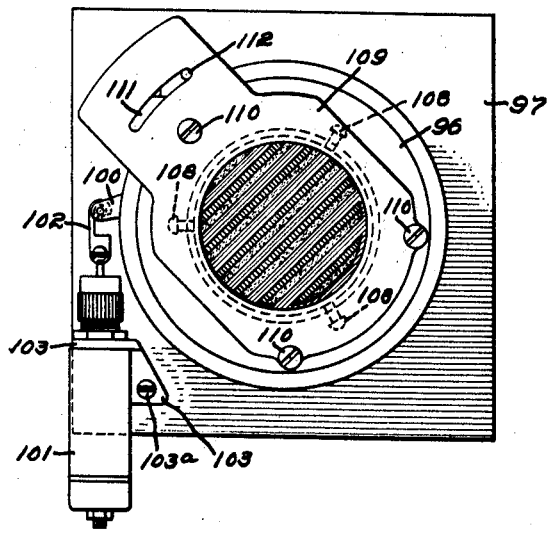
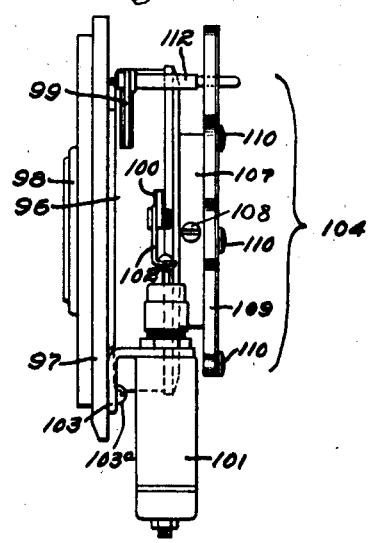
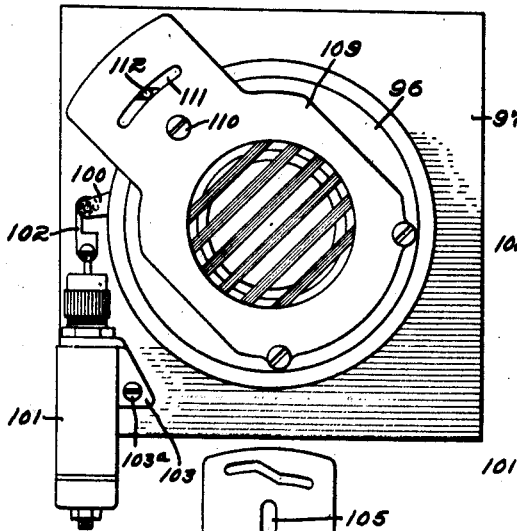
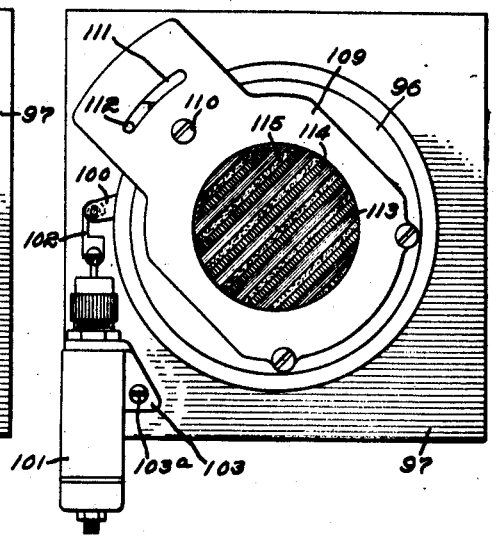
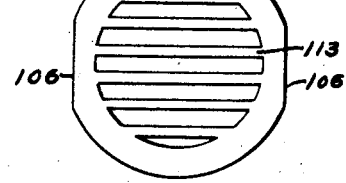
INVENTOR.
Oscar Steiner
BY
Attys.

June 22, 1943. O. STEINER 2,322,733
SHUTTER MECHANISM FOR PHOTOGRAPHIC CAMERAS
Filed Dec. 3, 1940 9 Sheets-Sheet 6
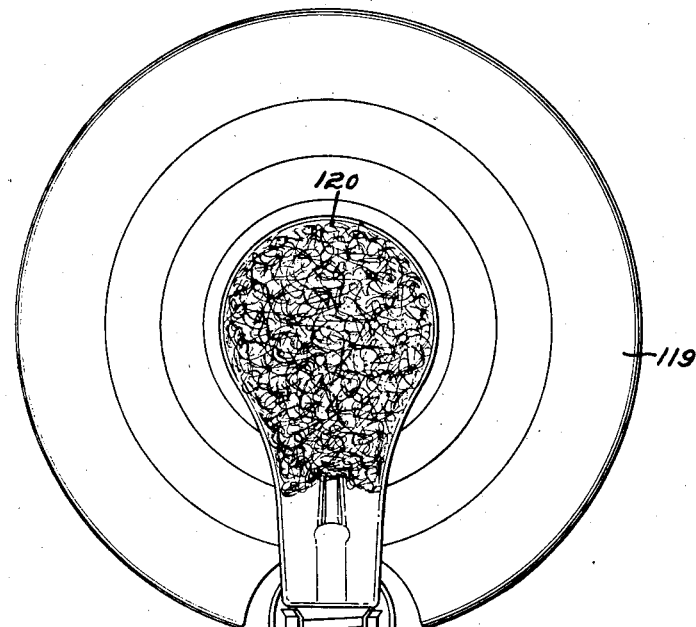
Fig. 20.
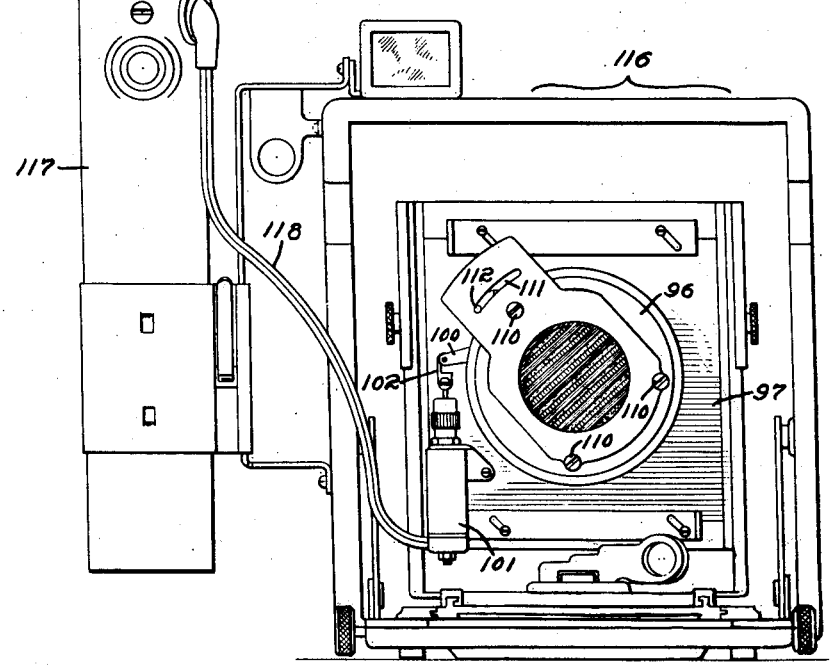
INVENTOR.
Oscar Steiner:
BY
Attys.

June 22, 1943.　　　O. STEINER　　　2,322,733
SHUTTER MECHANISM FOR PHOTOGRAPHIC CAMERAS
Filed Dec. 3, 1940　　　9 Sheets-Sheet 7

INVENTOR.
Oscar Steiner:
BY
Attys

INVENTOR.
Oscar Steiner

June 22, 1943. O. STEINER 2,322,733
SHUTTER MECHANISM FOR PHOTOGRAPHIC CAMERAS
Filed Dec. 3, 1940 9 Sheets-Sheet 9
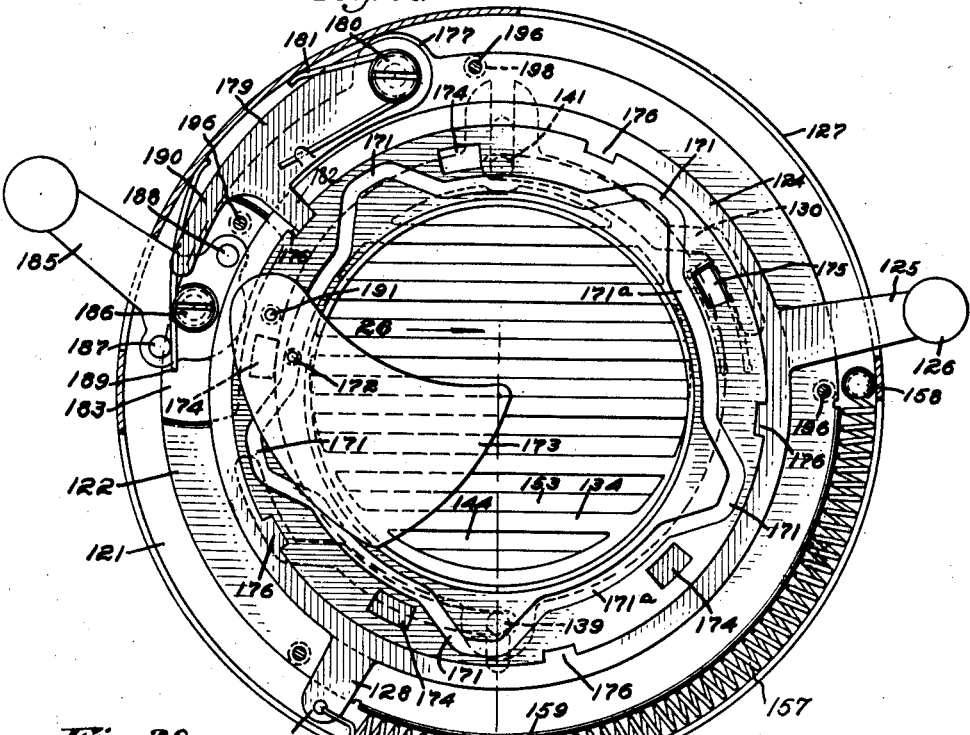
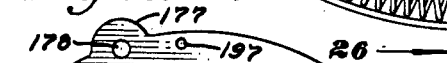
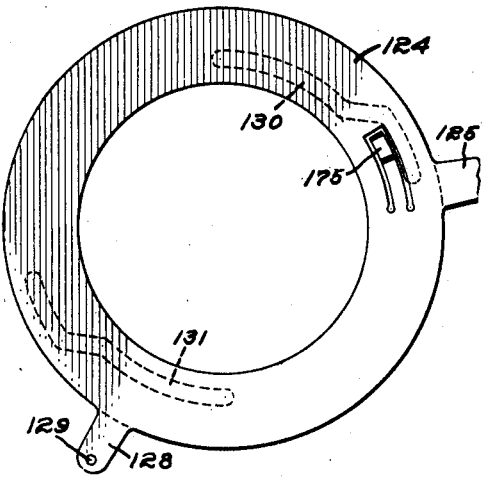
INVENTOR.
Oscar Steiner
BY
Attys.

Patented June 22, 1943

2,322,733

UNITED STATES PATENT OFFICE 2,322,733

SHUTTER MECHANISM FOR PHOTOGRAPHIC CAMERAS

Oscar Steiner, Rochester, N. Y., assignor to The Folmer Graflex Corporation, Rochester, N. Y., a corporation of Delaware Application December 3, 1940, Serial No. 368,394

50 Claims. (Cl. 95—56)

This invention relates to shutter mechanism for photographic cameras, particularly of or involving the so-called "grid shutter" type.

In order that the principle of the invention may be readily understood, I have disclosed certain embodiments of the mechanism thereof in the accompanying drawings, wherein—

Fig. 6 is a rear elevation of Fig. 1, showing the latching and tensioning means;

Fig. 7 is a cross section of Fig. 6 on the line 7—7 thereof showing the shutter grids in closed condition;

Fig. 8 is a front elevation of the shutter with the shutter cover plate and the shutter grids removed;

Fig. 9 is a fragmentary detail of the lower grid guide boss;

Fig. 10 is a front elevation of the grid shutter shown in closed condition;

Fig. 11 is a diagrammatic view of the shutter grids when the shutter is in a released or rundown condition, as in Fig. 10;

Fig. 12 is a front elevation of the shutter, the shutter having been released, and the grids having reached a position wherein the shutter is open;

Fig. 13 is a diagrammatic view of the shutter grids when in the condition shown in Fig. 12;

Fig. 14 is a side elevation, partly in section, showing the application of my invention to a focal plane camera using the mirror for capping the grid shutter;

Fig. 15 is a front elevation of the grid shutter as applied to a standard between-the-lens shutter, the grid shutter being in closed condition;

Fig. 16 is a left-side elevation of Fig. 15;

Fig. 17 is a front elevation similar to Fig. 15, but showing the shutter released, the shutter grids being shown in the fully opened condition;

Fig. 18 is a view similar to Fig. 15, but wherein the shutter has been operated and is in closed condition prior to resetting;

Fig. 19 is an elevation of the front grid used in the shutter shown in Fig. 15;

Fig. 20 is a front elevation of a camera showing the grid shutter applied to a standard between-the-lens shutter and connected for photo-flash synchronization;

Fig. 25 is a front elevation of a shutter with certain of the parts removed, showing the shutter in a fully open condition, the shutter blades being fully open and the grid bars so positioned as to overlie each other, thus permitting the greatest amount of illumination to pass through;

Fig. 27 is a front elevation of the shutter with some parts removed, showing the position of the inner grid when the shutter is closed, the closed position of the shutter leaf being also shown;

Fig. 28 is a front elevation of the shutter intermediate plate;

Fig. 29 is an elevation of the shutter-tensioning and grid cam plate; and

Fig. 30 is a diagram showing the duration of flash illumination, having indicated thereon the portion of flash used when making an exposure with grid shutter.

Figure 1:
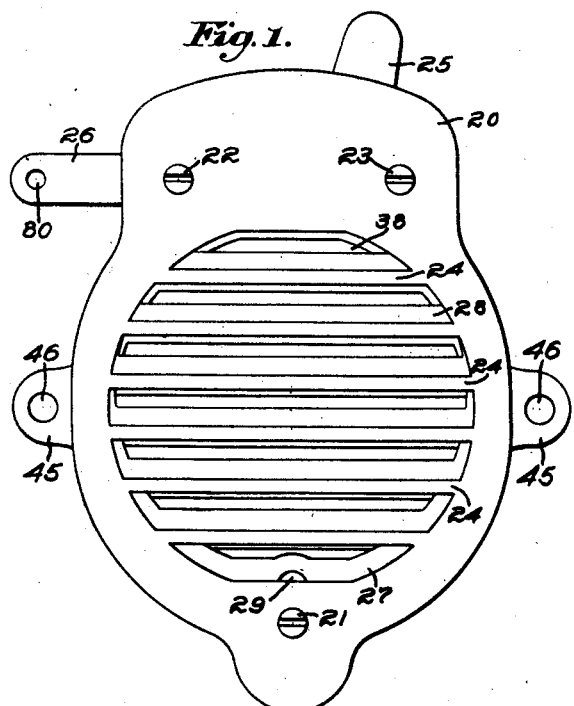
Fig. 1 is a front elevation of the grid shutter when in a set condition ready to make an exposure.

Important objects of this invention are to provide a shutter for obtaining very rapid exposures that are of relatively high efficiency; to provide means for coupling a high-speed shutter to a conventional between-the-lens shutter and which is to be operated thereby (i. e., by the between-the-lens shutter) ; to provide a high-speed shutter having grids that permit an extremely short movement of the masses constituting the shutter grids; to provide a high-speed grid shutter that can be attached to a reflex camera and synchronized therewith; to provide a shutter that can be synchronized with any of the flash bulbs now manufactured; and to provide a between-the-lens shutter having built therein a high-speed grid shutter, both shutters being operated by a single means.

This invention relates to new high-speed shutters using movable grids instead of the usual leaves or curtain. There have been numerous attempts to supply a shutter that can be used either as a between-the-lens shutter or a shutter to be attached to a lens barrel, operating either before the lens or behind the lens, to enable the operator to make a very rapid exposure. There are available numerous so-called high-speed shutters, but the highest speed in any shutter other than a focal plane shutter that I have been able to test is operated under $\frac{1}{400}$ of a second. This is not sufficient speed to stop motion in certain types of pictures, as, for instance, the various sports, automobile racing, etc. The focal plane shutter is capable of giving speeds of $\frac{1}{1000}$ of a second and higher, but when using this type of shutter, there is always a displacement of distortion of the image.

Another drawback of the focal plane shutter in high-speed picture making arises when photo-flash bulbs are being used. It is now possible to synchronize certain of the photo-flash bulbs with focal plane shutters to obtain fairly satisfactory results. Nevertheless the said displacement or distortion is maintained, and the flash bulb must have a duration of usable light of around 30 milliseconds. These flash bulbs are sold in rather small quantities and are hard to secure, and the cost is considerably more than of the flash bulb with a shorter light peak.

Another great disadvantage of the focal plane shutter with respect to the shutter herein disclosed is that if a flash bulb has a peak of, say, one million lumens seconds, the focal plane shutter, in making an exposure, uses a very narrow slot when the most rapid speeds are obtained. In a representative focal plane shutter, this slot or opening is approximately $\frac{1}{8}$ of an inch wide, and in a 4 x 5 camera, such slot has to travel four inches. Actually, it only travels $\frac{1}{8}$ of an inch in $\frac{1}{1000}$ of a second, and the flash duration to be available has to be sufficient to allow the aperture to travel entirely across the focal plane of the camera. Thus, if the travel is four inches, and the slot is $\frac{1}{8}$ of an inch, it requires 32 milliseconds for the curtain to travel entirely across the focal plane. This would necessitate a lamp maintaining a sufficiently high illumination for 32 milliseconds, even though an exposure of $\frac{1}{1000}$ of a second is being made.

In my present invention, however, if the exposure is $\frac{1}{1000}$ of a second, the peak of illumination would only have to be supplied in excess of one millisecond. It is a well-known fact in the manufacture of flash bulbs that either a long duration of flash with a fairly low peak, or a very high peak of illumination of very short duration is possible. The great majority of lamps that are manufactured today have a rather short peak lasting from five to eight milliseconds. Such a lamp has become the standard and it is readily obtainable on the market at a very low price.

In the use of my invention, employing a grid shutter, a maximum shutter opening of 60 per cent can easily be obtained, by reason of the employment of three grid plates in face-to-face relation (one of which is preferably stationary and the other two of which are preferably moved simultaneously in opposite directions), the bars of which plates are all flat and of substantially the same cross dimension, being very materially less than the cross width of each of the spaces of the plate, so that when the flat bars of all three grid plates are superposed, they, in the disclosed embodiment of the invention, obstruct substantially less than one-half of the total area within the rim of each grid plate, as will be set forth in detail at a subsequent part of this specification. Therefore, I can make use of 50 per cent of the light produced by a photo-flash bulb during its peak, whereas in the focal plane shutter, even with the long duration type of flash bulb, when making an exposure of $\frac{1}{1000}$ of a second, the aperture only moves $\frac{1}{32}$ of the distance across the focal plane. It is impossible in such case ever to obtain an efficiency in the use of the illumination greater than 10 per cent.

I will now describe several embodiments of the mechanism of my invention, all involving a grid structure. In the first embodiment thereof shown in Figs. 1 to 14, the grid shutter is adapted to be attached to any lens mount, and the focal plane shutter or the mirror of a reflex camera may be employed for capping the grid shutter; in the second embodiment thereof, shown in Figs. 15 to 20, the grid shutter is mounted on the lens barrel of a lens fitted to a between-the-lens shutter, the grid shutter being operated by one member or part of the between-the-lens shutter; and in the third embodiment of my invention, shown in Figs. 21 to 29, the grid shutter is built into the between-the-lens shutter and is operated from parts within that shutter. My invention is not limited to these three embodiments.

I will describe these several disclosed embodiments in the specified order.

Referring first to Figs. 1 to 5, wherein the parts are shown of the high-speed grid shutter that is particularly adapted to be attached to the lens barrel of the camera either in front or in back of the lensboard therefor, the outer cover of the shutter is indicated at 20, it being attached to the shutter frame by means of screws 21, 22, 23. The said cover 20 is provided with a central opening having a grid formation extending thereacross composed of grid bars 24, 24. The purpose thereof is to protect the operating grid plates or leaves of the grid shutter. The grid shutter itself is provided with a setting or reset lever 25, the purpose whereof is to cock or set the shutter grid plates or leaves prior to an exposure. The grid shutter is released by means of a release lever 26, thereby permitting the shutter grid plates or leaves to move in their functioning operations.

Figure 2:
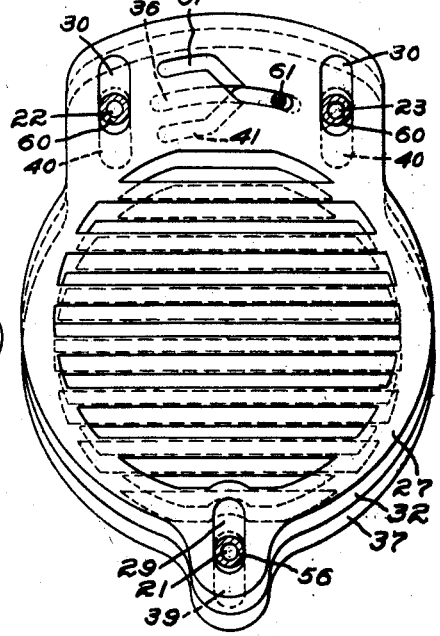
Fig. 2 is a diagrammatic plan view of the three grids that make up the grid shutter, when in the closed set condition.
Figure 3:
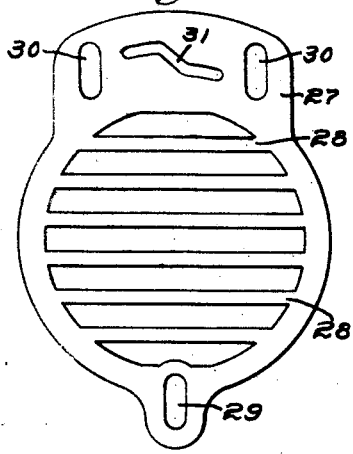
Fig. 3 is a detail in elevation of the front grid.
Figure 4:
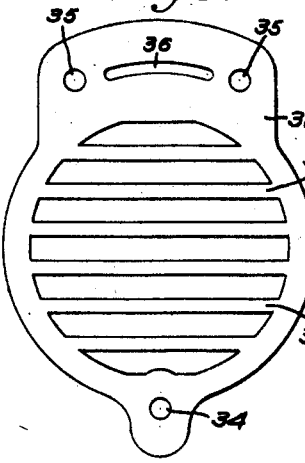
Fig. 4 is a detail in elevation of the central or stationary grid.
Figure 5:
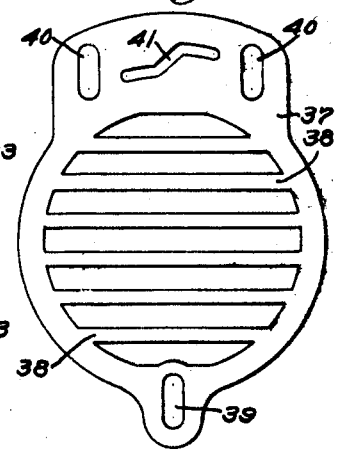
Fig. 5 is a detail in elevation of the back grid.

In Fig. 2, there are represented the three shutter grid plates or grid leaves superimposed upon each other, so that the various grid bars thereof overlap and exclude all light from the lens. The purpose of employing three grid plates is that, since there must be some overlap of the flat bars of the plates when the shutter is closed, it is impossible with two grid plates to obtain a greater total aperture than forty per cent, and the shutter would therefore pass only forty per cent of the light that would be passed by the lens if there were no obstruction. By employing three grid plates, I can obtain a greater opening or aperture, since the flat bars of all three grid plates are utilized to cover the spaces, and the cross sectional dimension of each bar is substantially less than the width of either adjacent space, or, in other words, of the total internal measurement of each grid plate in a direction transverse to the bars, substantially less than half is occupied by the bars and substantially more than half by the spaces. The front grid plate or leaf is represented at 27. While it may be of any suitable material, it is preferably a very thin sheet metal, desirably beryllium copper having a large central opening crossed by flat grid bars 28, 28, and having elongated slots 29 and 30, 30, for guiding the said grid plate or leaf. Between the said slots 30, 30 is a transversely extending slot 31 which is of substantially an inverted or reversed "S" formation, and forming a cam or cam path for operating the said shutter plate or leaf 27. Underlying the said front grid plate or leaf 27 is an intermediate or central stationary grid plate or leaf 32, shown separately in Fig. 4 and having flat grid bars 33, 33 and mounting holes 34 and 35, 35. Between the mounting holes 35, 35 is an arcuate slot 36 transversely extending and providing clearance for the operating pin, to be described. Underlying the said central stationary grid plate or leaf is the back grid plate or leaf 37, separately shown in Fig. 5 and having flat grid bars 38, 38, an elongated bottom slot 39 and, at the top, two elongated slots 40, 40 between which latter is a transversely extending cam or cam path formed as a slot of substantially S-shape similar to the slot 31, but oppositely disposed. Each of the flat grid bars 28, 33 and 38 has a transverse width that is substantially less than the width of the adjacent space at either side of such bar.

Referring next to Figs. 6, 7 and 8, wherein certain of the parts are shown, the shutter mounting or back plate is shown at 42, it having a centrally extending tubular portion or barrel 43 to which is attached a mounting flange 44 having mounting ears 45, 45 and mounting holes 46, 46. Also fitted to the said shutter mounting or back plate 42 is the shutter release lever 26 secured to said plate by a shoulder screw 47. On the opposite end of the said release lever 26 is provided in any suitable way a release dog 48, the purpose of which is to engage and hold a shutter release pin 49 of the shutter setting or reset lever 25. Attached to the said shutter release pin 49 is a coiled spring 50 wrapped partially about the shutter barrel 43 and held in position by means of a shoulder screw 51 threaded into the shutter mounting or back plate 42. The said coiled spring 50 tends to move the shutter release pin 49 in a clockwise direction, viewing Fig. 6. The shutter setting or reset lever 25 is connected to a shutter setting ring 52, best shown in Fig. 8, said shutter setting ring being fitted to a cylindrical projection 53 of the shutter barrel 43, as most clearly shown in Figs. 7 and 8. The said shutter mounting or back plate 42 has, as best shown in Fig. 8, an arcuate slot 54 for the passage of the shutter release pin 49. The said shutter setting ring 52, as shown in Fig. 8, is provided with a cut-away segment 55 for engaging a bushing 56 of the shutter mounting or back plate 42, thus limiting the movement of the said shutter setting ring 52.

Inasmuch as the shutter release pin 49 is caused to turn in a clockwise direction by the coiled spring 50, viewing Fig. 6, when the setting or reset lever 25 is moved in a contraclockwise direction, the said shutter release pin 49 will be engaged by the dog 48, thus holding said setting or reset lever 25 in that position until released by the release lever 26. The said dog 48 is caused to be turned in a contraclockwise direction for engagement with the shutter release pin 49 when in the set condition by a spring 57, shown in Figs. 6 and 7 as secured to the shutter mounting or back plate 42 by a screw 58. The movement of the said shutter release lever 26 is limited by stop pins 26a, 26a, which are attached as shown in Fig. 6, to the shutter mounting or back plate 42. Also attached to the front face of the said plate 42 are guide bushings 59 and 60 shown in Fig. 8.

Referring particularly to Fig. 7, the said shutter release pin 49 extends through the slot 54 and is anchored to the shutter setting or reset lever 25 and projects therebeyond as a cylindrical finger 61, passing through the cam slot or path 31 of the front grid plate or leaf 27, through the clearance provided by the slot 36 of the central stationary grid plate or leaf 32 and through the cam path or formation 41 of the back shutter grid plate or leaf 37. The slot 29 of the shutter grid plate or leaf 27, the hole 34 of the shutter grid plate or leaf 32, and the opening 39 of the shutter grid plate or leaf 37, are all placed over the guide stud or bushing 56, shown upon an enlarged scale in Fig. 7. The said stud or bushing 56 serves also as a spacer between the shutter mounting or back plate 42 and the shutter outer cover 20. The elongated openings 30, 30 of the grid plate or leaf 27, the holes 35, 35 of the shutter grid plate or leaf 32 and the elongated openings 40, 40 of the grid plate or leaf 37 are all placed over the guide studs 59, 60, respectively, and are so relatively positioned that the finger or operating pin 61 passes through the cam formation or path 31 of the grid plate or leaf 27, through the clearance slot 36 of the stationary grid plate or leaf 32 and through the cam formation or path 41 of the grid plate or leaf 37. As the shutter setting or reset lever 25 is in its released position, the several shutter grid plates or leaves are positioned as shown in Fig. 7 and also in Fig. 11, wherein the front grid plate or leaf 27 is shown as having been moved downwardly under the influence of the operating pin 61 and the cam formation or path 31. The shutter grid plate or leaf 32, however, always remains fixed, being mounted in a stationary position, and the shutter grid plate or leaf 37 will have been moved upwardly under the influence of the operating pin 61 and the cam formation or path 41, so that the several grid plates or leaves are positioned as shown in Figs. 7, 10 and 11. As clearly appears from the sectional view, Fig. 7, all the spaces are overlapped by bars that themselves overlap.

If, now, the shutter setting or reset lever 25 is moved in a clockwise direction viewing Fig. 1, the movable grid plates or leaves will be moved to the position shown in Fig. 2, wherein the grid plate or leaf 27 is shown as moved upwardly under the influence of the operating pin 61 and of the cam formation or path 31. The central shutter plate or leaf 32, of course, remains stationary, and the back grid plate or leaf 37 will be moved downwardly into the position shown in Figs. 1 and 2.

When the shutter setting or reset lever 25 has been moved in a clockwise direction to the position shown in Fig. 1, the shutter release pin 49 will be engaged by the dog 48 of the release lever 26, and the several grid plates or leaves will be in the position shown in Fig. 2. The said cylindrical operating pin 61, which extends through the cam formations or paths 31 and 41 and the clearance slot 36, will also be in the position shown in Fig. 2. When the shutter release lever 26 is pressed, thereby releasing the shutter release pin 49, the shutter setting or reset lever 25 will be moved in a contraclockwise direction viewing Fig. 1, or in a clockwise direction viewing Fig. 6, through the instrumentality of the coiled spring 50. Inasmuch as the operating pin 61 is attached to the setting or reset lever 25, the said operating pin 61 will be caused to travel with the setting or reset lever 25, namely, in a contraclockwise direction viewing Fig. 2, when the shutter release lever 26 has been depressed. When the said operating pin 61 reaches the position shown in Fig. 13, the grid plate or leaf 27 will be moved downward until the openings therein coincide with the openings in the grid plate or leaf 32, and the grid plate or leaf 37 will be moved upwardly until the openings therein coincide with the openings in the grid plate or leaves 27 and 32. The grid shutter will then be in the full open position or condition shown in Fig. 12. the grid plates or leaves thereof being positioned as shown in Fig. 13, and the shutter setting or reset lever 25 will also be in the position shown in Fig. 12.

As the said setting or reset lever 25 and the operating pin 61 continue to travel in a contra-clockwise direction, viewing Fig. 12, until the position shown in Fig. 10 is reached, the said operating pin 61 will have reached the position shown in Fig. 11, wherein the grid plate or leaf 27 is shown as moved all the way down, and the grid plate or leaf 37 moved all the way up, thus completing the exposure. As the shutter setting or reset lever 25 is moved in a clockwise direction, viewing Fig. 1, carrying with it the operating finger 61, the grid plates or leaves will be caused to be moved to the position shown in Fig. 2. That is to say, the grid plate or leaf 27 will be moved all the way up and the grid plate or leaf 37 will be moved all the way down, thus again closing the grid shutter, but restoring it to the set condition in which the operating pin 61 will be in the position shown in Fig. 2, and the release pin 49 will be engaged by the dogs 48, ready for a second exposure.

The grid shutter just described and constituting the said first embodiment of my invention, is an attachment adapted to be placed on the lens barrel of a photographic lens and to be held thereto by screws (not shown) passing through the holes 46, 46 of the lugs 45, 45, into the usual lensboard of the camera. If no other shutter is used in the camera, it would be necessary to put the dark slide in the plate holder when the grid shutter is reset for a second exposure. The grid shutter herein disclosed, however, is particularly well adapted to be used on a reflex type of camera as claimed in my co-pending application Ser. No. 398,791, filed June 19, 1941, especially when taking photo-flash exposures, as the mirror of the said camera will then serve as a capping means when resetting the grid shutter and the grid shutter can be actuated or released for exposure by any well known or suitable means, such as by the use of the magnet of a synchronizer tripper that is disclosed in my co-pending application Ser. No. 346,395, filed July 19, 1940, and an electrical contact can be made when the pivoted mirror of the camera reaches a point close to the end of its travel in an upward direction.

Such manner of operation and such construction, arrangement and relation of parts are indicated and shown in Fig. 14, wherein the casing or frame of a reflex camera of the well known Graflex type is indicated at 62, it having a pivoted mirror 63, a mirror reset arm or lever 64, a mirror holding latch 65 supported on a shoulder screw 66, a mirror release lever 67 having fast therewith a shaft 68 suitably mounted in the casing of the camera, and a second lever 69 fast on the shaft 68. When the mirror release lever 67 is depressed, the shaft 68 is turned thereby in a clockwise direction, carrying with it the said second lever 69 which engages one end of the mirror holding latch 65, causing it to turn in a contraclockwise direction, thereby releasing the pivoted mirror 63, shown as mounted fast for rocking movement upon a shaft 70, thus causing said mirror to swing upwardly under the influence of a spring (not shown, but well known in the art). As the said mirror 63 swings upwardly, turning the shaft 70, the mirror reset arm or lever 64 will be caused to turn in a contraclockwise direction, and when said mirror reaches the end of its upward travel, the shutter curtain 71 will be released and allowed to run down. The structure of such shutter curtain and its manner of operation are well known in the art.

When preparing the camera for an exposure, the said shutter curtain 71 is wound to the "open" condition, indicated on the shutter speed dial by the letter "O," the mirror having been previously reset. While the shutter curtain 71 is in the "open" condition, light cannot reach the sensitized material inasmuch as the mirror 63 intercepts any light coming through the object lens, and deflects it to the usual focusing screen or ground glass 72. The said reflex camera is equipped with the usual lens barrel 73 and lensboard 74, and to the forward portion of the said lens barrel 73 there is attached the grid shutter of the said disclosed embodiment of my invention. There is also attached to the lensboard 74 a magnetic tripper 75 by means of a bracket 76 secured to the lensboard by screw 77. The said magnetic tripper has a connecting link 78 secured to the shutter release lever 26 by means of a shoulder screw 79, shown in Fig. 14 as passing through a hole 80 therein (that is shown in Figs. 1, 6, 10 and 12 in the said release lever 26).

In order to make an exposure, the shutter setting or reset lever 25 is turned in a clockwise direction to the position shown in Fig. 1, the mirror 63 having been previously set in the position shown in Fig. 14 and the shutter curtain 71 being moved or adjusted to the "open" position. When the said mirror release lever 67 is released, thus releasing the mirror 63, the latter swings upwardly, turning the shaft 70 and the mirror reset arm or lever 64, which latter will engage the insulating button 81 of the contact arm 82 shown in Fig. 14 as attached to the camera casing 62 by wood screws 83, 83, thus causing the contact or terminal 84 to engage the contact or terminal screw 85 threaded into a contact screw supporting member 86 secured to the camera casing 62 by wood screw 87, 87, thus completing a circuit through the wire 89 attached to the contact screw supporting member or block 86, the magnetic tripper 75, the wire 90, the battery 91, the wire 92 and the contact arm 82. Attached to the wire 90 is a wire 93 connected to one terminal of the flash bulb 94, and to the wire 89 is connected a wire 95 that is itself connected to the other terminal of the flash bulb 94.

In the said first embodiment of my invention and the particular use thereof in a camera of the reflex type, I have disclosed very simple but accurately functioning means for completing the circuit through a magnetic tripper for the purpose of actuating the movable parts or elements of the grid shutter. It will be apparent, however, that within the scope and purpose of my invention, the grid shutter may be actuated in a great many different ways. For example, the electrical contacting mechanism shown in the patent to Torkel Korling, No. 2,029,238, dated January 28, 1936, may be used. Also, within the scope and purpose of my invention, as alternative means I control the movable elements of the grid shutter by a mechanical connection extending from and between the mirror 63 and the grid shutter release lever 26, using therefor the connecting mechanism disclosed in my co-pending application Ser. No. 313,534, filed January 12, 1940, now Patent No. 2,236,925, dated April 1, 1941.

I will now give a brief summary of the operation of this first embodiment of my invention when using the same in a camera of the reflex type as particularly claimed in my said co-pending application Ser. No. 398,791, its use in other types of cameras, such as the Graphic camera, being evident from the foregoing description.

The mirror 63 thereof, shown in Fig. 14, is set in the position there shown by a clockwise movement of the mirror reset arm or lever 64, and the shutter curtain 71 is positioned in the "open" condition, which will be indicated by the letter "O" disclosed in the opening of the shutter plate. The grid shutter itself is set or cocked by moving the setting or reset lever 25 to the right, viewing Fig. 1. A flash bulb is placed in circuit in the usual socket provided for the purpose, and the reflex camera is now ready for making an exposure. The said camera will be focused in the usual manner and the mirror release lever 67 depressed, releasing the mirror 63 and allowing it to swing upward. At, or very nearly at, the limit of upward travel of the said mirror 63, contact will be made between the terminal 84 and the terminal screw 85, closing the circuit through the magnetic tripper 75, which will cause a release of the movable element of the grid shutter through the agency of the release lever 26, and at the same time the photo flash lamp 94 will be ignited. At the time the contacts 84 and 85 are closed, the shutter curtain 71 is released and thereby allowed to run down, thus capping the sensitized material located in the usual holder. Inasmuch as it is necessary to reset the mirror 63 before the shutter curtain 71 can then be rewound, a definite cycle of operations must take place, as the structure of the Graflex camera requires the same. However, the grid shutter itself can be reset either before or after the mirror 63 has been restored to viewing position, and the shutter curtain 71 has been rewound to the "open" condition, viewing Fig. 14, because the sensitized material positioned in the camera will be capped either by said mirror 63 or by an opaque portion of the shutter surface 71.

Thus I have, among other things, described one use of the grid shutter of my invention in such a way as to secure a type of exposure not possible prior to my invention.

The second embodiment of my invention is shown in Figs. 15 to 20 of the drawings, wherein the grid type of shutter herein disclosed is attached to a conventional between-the-lens shutter. For the purpose of fully disclosing such second embodiment of my invention, I have elected to show a shutter of the well known Compur type, but within the scope of my invention, any suitable type of between-the-lens shutter may be used.

Referring to said Figs. 15 to 20, the between-the-lens shutter is designated generally at 96 and the conventional lensboard at 97, the shutter being mounted thereon and having a rear lens element 98 protruding through the lensboard 97. The said between-the-lens shutter 96 is provided with the usual reset lever 99 and the usual release lever 100. In order to operate the shutter by remote control or in synchronism with a photo-flash bulb, I have provided a magnetic tripper 101 preferably of the general structure previously referred to in the explanation of one use of the grid shutter of my invention, and I have provided a mechanical connection 102 for the purpose of connecting an armature of the said tripper 101 to the shutter release lever 100. The said magnetic tripper is secured to the lensboard 97 by a bracket 103 held to the said lensboard by screws 103a. Attached to the front lens cell of the between-the-lens shutter 96 is the grid shutter indicated generally at 104 and which is preferably of substantially the structure herein disclosed in connection with the first embodiment of my invention in Figs. 1 to 13, including the described cross sectional dimensions of the bars and the spaces. The grid shutter of the second embodiment of my invention is, however, actuated by the between-the-lens shutter 96, and therefor it is not equipped with a separate setting and releasing means. Furthermore the shutter grid plates or leaves are also modified in that only one sliding slot 105 is provided, as shown in Fig. 19, and the further guiding of the plates or leaves is obtained by the flattened edges 106, 106, shown in said figure. Such grid shutter of the second embodiment of my invention is provided with three grid plates or leaves respectively having the cam formations or slots, shown in Figs. 3, 4 and 5 of the drawings. The grid shutter is also provided with a back flange 107, shown in Fig. 16, which is clamped to the front lens coil of the camera by means of clamping screws 108, 108, Fig. 15. The back flange 107 is secured to a back plate (not shown, but which is of a construction similar to that shown in Fig. 8 hereof). The shutter grid plates or leaves are placed between the said back plate and the shutter front cover plate 109 that is held to the back plate by screws 110. The said shutter front cover plate 109 is provided with an elongated segmental opening 111 for receiving the shutter grid plates or leaves-operating pin 112. The grid shutter is provided, as in the first embodiment of my invention, with three grid plates or leaves, namely, a movable outer or front grid plate or leaf, a stationary central grid plate or leaf and a movable back grid plate or leaf, the said outer grid plate or leaf having grid bars 113, the said central grid plate or leaf having grid bars 114 and the back grid plate or leaf having grid bars 115.

In Fig. 15, the between-the-lens shutter cocking or setting or resetting lever 99, which is more fully indicated in Fig. 16, has been turned in a clockwise direction until the between-the-lens shutter is set, thus carrying with it the grid shutter operating pin 112, and during this cycle the grid bars 113 have been moved in an upward direction and the grid bars 115 in a downward direction, thus completely closing the shutter opening.

In Fig. 17, however, the between-the-lens shutter has been released by the magnetic tripper 101 and the shutter tripping lever 100, so that the between-the-lens shutter 96 is fully opened, and the grid bars 113, 114, 115 all overlie each other, thereby providing maximum openings, and the shutter grid operating pin 112 has traveled to a central position in the slot 111.

In Fig. 18, the grid operating pin 112 has, however, traveled all the way to the end of the said slot 111, thus again moving the outer grid bars 113 in a downward direction, and the back grid bars 115 in an upward direction, such motion continuing until the grid bars 113, 114 and 115 completely close the said opening.

It will be understood that I have thus provided means for converting a conventional between-the-lens shutter having a set lever into an ultra high-speed shutter having the grid plates of the grid shutter of my invention operated by the usual between-the-lens shutter, and I desire to claim broadly means for accomplishing this generic result. Other means than those shown may, within the scope of my invention, be provided for this purpose.

Making reference to Fig. 20, there is therein shown a camera designated generally at 116, which may be of any suitable type (whether Graphic, Graflex or other type), and which has been equipped, in accordance with my invention, with a between-the-lens shutter 96 and an auxiliary grid shutter such as herein disclosed and provided with the magnetic tripper 101 connected to the battery case 117 by means of a cable 118. Desirably the battery case has the usual reflector 119 and there is provided a suitable flash bulb 120. It will be understood, however, that within the scope of my invention, the shutters of this embodiment of my invention may be operated by manual pressure on the shutter release lever 100 of Fig. 16, when photo-flash bulbs are not used, or the usual cable release can be used for making exposures when the flash synchronizer is not being used. It is to be understood that the synchronization may be effected in any suitable manner and that I need not employ for that purpose a magnetic tripper, but may provide any suitable means whether electrical or otherwise for accomplishing this result.

By means of the structure in Figs. 15 to 20, and constituting the second embodiment of my invention, it is possible to make photo-flash exposures of a duration of $1/1000$ of a second or less, using the conventional between-the-lens shutter as a capping means for the grid shutter of my invention.

In the usual between-the-lens shutter of the Compur type, the shutter reset lever 99, shown in Fig. 16, starts to travel in a clockwise direction, viewing Fig. 15, when the said between-the-lens shutter is released by the release lever 100. The shutter leaves of a between-the-lens shutter start to open as soon as the reset lever 99 starts to move, and the said leaves of the between-the-lens shutter continue in motion until said reset lever reaches the limit of its travel, at which time the shutter leaves of the between-the-lens shutter have again closed.

Inasmuch as in the grid shutter of my invention, I use approximately only one third of such travel in order fully to open and fully to close the said grid shutter, the exposure made by the grid shutter will be approximately three times as fast as the exposure made by the between-the-lens shutter. Thus, if the between-the-lens shutter is set for $1/300$ of a second, the actual exposure obtained by the said grid shutter will be $1/900$ second, and inasmuch as the leaves of the between-the-lens shutter are fully opened between the period of opening and closing of the grid shutter, the leaves of the between-the-lens shutter in no way restrict the passage of light through the grid shutter as it opens and closes.

I will next describe, with reference to Figs. 21 to 29, the third embodiment of my invention, consisting of a between-the-lens shutter which has built thereinto grid plates, members or leaves for securing extremely high speed. The between-the-lens shutter that is shown as a part of the third embodiment of my invention, is here shown as similar to the structure disclosed in my copending application Ser. No. 368,011, filed substantially simultaneously herewith, now Patent No. 2,269,400, dated January 6, 1942.

Figure 21:
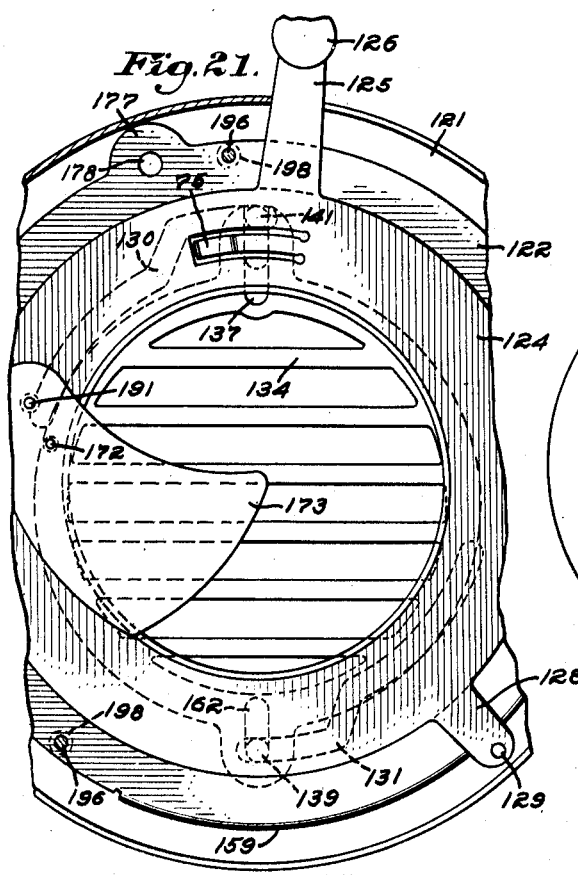
Fig. 21 is a front elevation of a between-the-lens shutter having auxiliary shutter grids with certain parts removed, the downwardly moving or forward grid only being shown, the shutter being shown as having completed an exposure prior to resetting for a second exposure.
Figure 22:
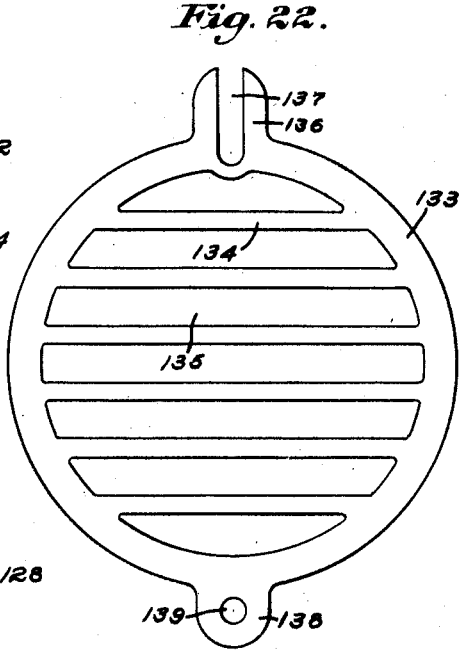
Fig. 22 is a front elevation of the forward or downwardly moving grid.
Figure 23:
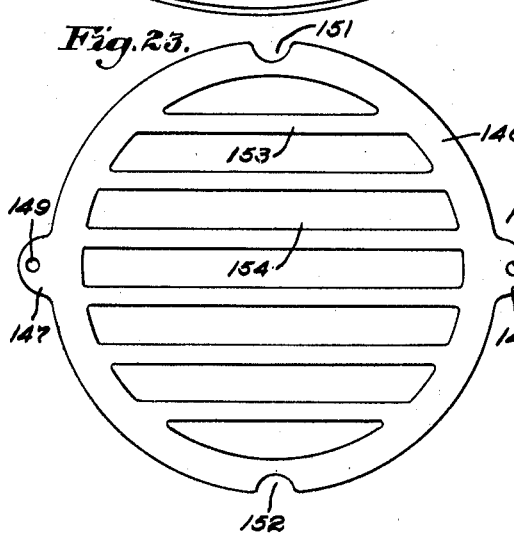
Fig. 23 is a front elevation of the central or stationary grid.
Figure 24:
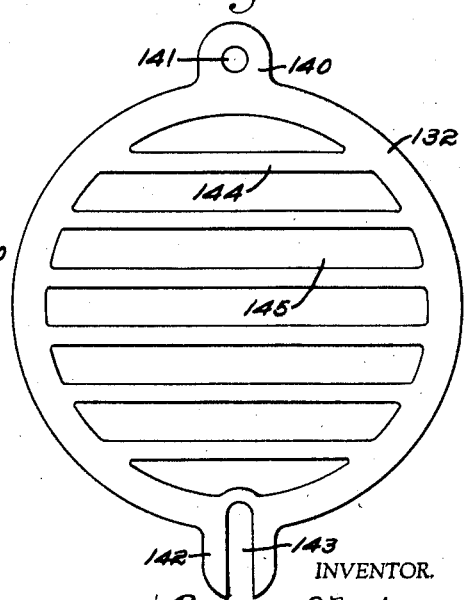
Fig. 24 is a front elevation of the inner or upwardly moving grid.
Figure 25:
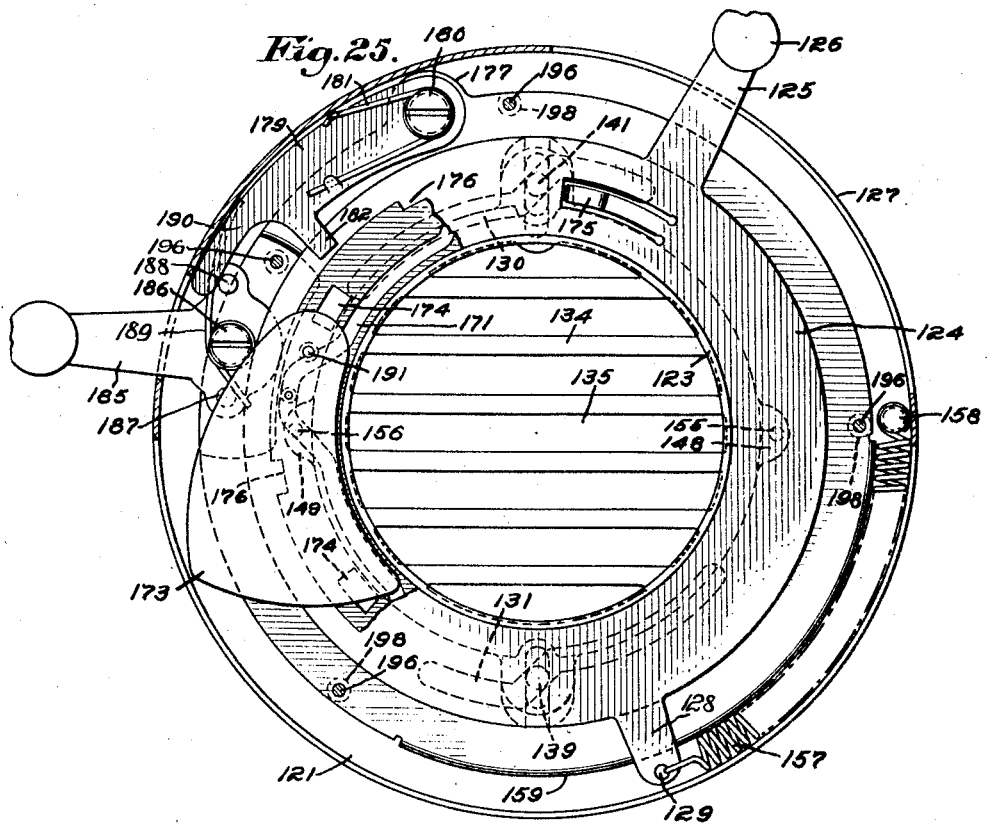
Figure 26:
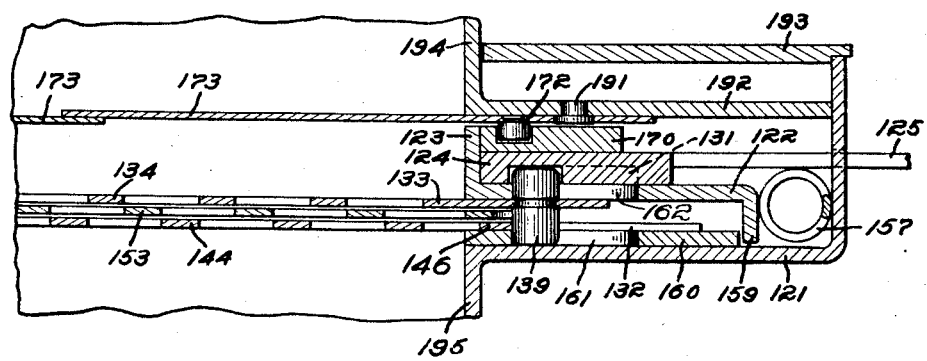
Fig. 26 is a partial transverse section through Fig. 27 on the line 26—26 thereof, showing the shutter blades and the shutter grids in the closed or normal condition.

Referring to the said Figs. 21 to 29, and first referring particularly to Figs. 21, 25 and 26, a shutter housing is shown at 121 as having a shutter intermediate plate 122, best shown in Figs. 21 and 26, and having a cylindrical boss 123 itself best shown in Figs. 25 and 26. Fitted to the said cylindrical boss 123 and resting on the shutter intermediate plate 122, is a shutter tensioning ring 124 provided with a handle 125 having a knob 126. The said handle passes through an elongated slot 127 in one wall of the shutter housing 121. The said shutter tensioning ring 124 is provided, as shown in Fig. 25, with a second arm 128 having a hole 129 for receiving one end of a coiled spring thus connected to the shutter tensioning ring 124. On the back face of the said shutter tensioning ring 124 are cut cam formations 130 and 131, which control the operation of the shutter grid plates or leaves 132 and 133, the former of which is the movable forward grid plate or leaf and the latter of which is the inner or back movable grid plate or leaf. In Fig. 22, the said grid plate or leaf 133 is shown as having grid bars 134 and openings 135 therebetween. At the upper end of the said grid plate or leaf 133 is provided a boss or projection 136 having a slot or elongated opening 137 and opposite thereto is a second boss or projection 138 having an attached pin 139. The said movable inner grid plate or leaf 132 is shown in Fig. 24 as having at its upper end a boss or projection 140 provided with a pin 141 and opposite said boss 140 is a second boss or projection 142 having a slot or elongated opening 143. The said grid plate or leaf 132 is provided with grid bars 144 and openings 145 therebetween. In Fig. 23, there is represented the intermediate or stationary grid plate or leaf 146 having at opposite sides thereof bosses 147, 148 provided respectively with holes 149, 150. In the outer rim of the said grid plate or leaf, intermediate the said bosses, are provided notches 151 and 152, the former providing clearance for the pin 141 and the latter for the pin 139. The said stationary grid plate or leaf 146 is provided with grid bars 153 and openings 154 therebetween. The said movable shutter grid plate or leaf 133 is controlled by the cam formation 131 and the pin 139, shown in Fig. 21, wherein is represented only the said outer grid plate or leaf 133. The shutter tensioning ring 124 is shown in Fig. 21 as in its released condition, and the said grid plate or leaf 133 has been moved downwardly.

Referring next to Fig. 25, the grid shutter is shown in a full open condition, the grid plate or leaf 133 having been moved so that the grid bars 134 thereof overlie the grid bars 153 of the intermediate stationary grid plate or leaf 146, which is always held in the stationary position, shown in dotted lines in Fig. 25, by means of pins 155 and 156. The back movable grid plate or leaf 132 has been moved upwardly until the bars 144 thereof overlie the bars 134 and the bars 153 of the front grid plate or leaf 133 and the intermediate or stationary grid plate or leaf 146 respectively. A continued motion of the shutter tensioning ring 124 will cause the shutter grid plate or leaf 133 to be moved all the way down, and the back shutter grid plate or leaf 132 to be moved all the way up, thus closing the grid shutter, in which case the shutter tensioning ring 124 and the cam formations 130 and 131 will be in the position shown in Fig. 21.

In said Fig. 25, a coiled spring 157 is shown as having one end hooked in the hole 129 of the arm 128, the opposite end of said spring being hooked about a pin 158 secured to the shutter housing 121. The shutter intermediate plate 122 is provided with a turned-down rim 159 for supporting the said coiled spring 157, which spring causes the shutter tensioning ring 124 to be turned in a contraclockwise direction. When the said shutter tensioning ring 124 has been turned in a clockwise direction, to the limit of its motion as imposed by the slot 127, and is held there by means subsequently herein described, the shutter grid plate or leaf 133 will have been moved all the way up and the grid plate or leaf 132 will be moved all the way down. The shutter will now be in the condition shown in Figs. 26 and 27, wherein the shutter grid bars will so overlap as to exclude all passage of light through the grid shutter.

As shown in Fig. 26, there is attached to the bottom wall or back plate of the shutter housing 121 a guide plate 160 having a slot 161 to guide the pin 139. The shutter intermediate plate 122 is provided with a slot 162 also for the purpose of guiding the said pin 139. On the opposite side of the shutter is a similar structure of parts for guiding the pin 141. As shown in Fig. 25, overlying the shutter tensioning ring 124 is a shutter leaf operating or cam ring 170, most clearly shown in Figs. 26 and 27, which ring is provided with a cam groove formation 171 cooperating with a pin 172 of the shutter leaves 173 of the between-the-lens part of the shutter. The said shutter leaf operating or cam ring 170 is also provided with rectangular openings 174, Figs. 26 and 27, which are engaged by a spring dog 175 of the shutter tensioning ring 124, and about the periphery of the said shutter leaf operating or cam ring 170 is provided a series of notches 176. It will be observed, viewing Fig. 27, that there are five cam formations 171 of general inverted U or V-shape, and between which are concentric paths or guiding formations 171a, Fig. 27. There are also five rectangular openings 174 and five notches 176, the between-the-lens portion of the shutter being of the five-leaf type. Any suitable number of such leaves may be provided and the number of cam formations, rectangular openings and notches would be in accord therewith, as, for example, four such cam formations, four such rectangular openings and four such notches if four leaves only are employed. For clearness of illustration, only one shutter leaf of the between-the-lens portion of the shutter is shown at 173. As the tensioning ring 124 travels the length of the slot 127, the shutter leaf operating or cam ring 170 will be turned one fifth of a complete revolution or 72 degrees, causing one cam formation 171 to pass the pin 172 of the shutter leaf 173, thus causing said shutter leaf (and in actual practice all the shutter leaves of the between-the-lens part of the shutter) completely to open and to stay open for a short period of time corresponding to the flat portion of the apex of each cam formation 171, and then to close. During the time the shutter leaves 173 are in the full open condition, the shutter grid plates or leaves 132, 133 are caused fully to open and to close in the manner already described.

Referring to Fig. 28, in connection with Figs. 25 and 27, the shutter intermediate plate 122, separately shown in Fig. 28, is provided with a boss 177 having a threaded hole 178 for the attachment of a shutter leaf-operating or cam-ring-release lever 179, Figs. 25 and 27, which is connected to the shutter intermediate plate 122 by means of a shoulder screw 180, and is caused to be turned in a countraclockwise direction by means of a spring 181. The release lever 179 is provided with a dog formation or projection 182 for engaging the notches 176 of the shutter leaf operating or cam ring 170. The said shutter intermediate plate 122 has, as best shown in Fig. 28, a recess or depressed formation 183 having a threaded hole 184 receiving a release lever 185 held therein by a shoulder screw 186.

The said release lever 185 has a duplex crank formation provided with pins 187, 188, said pin 187 being engaged by a spring 189 wrapped around the screw 186 and resting against the outer wall of the shutter housing 121, causing the release lever 185 to be turned in a clockwise direction. When, viewing Fig. 27, downward pressure is applied to the shutter release lever 185, the pin 188 will engage the finger 190 of the shutter leaf-operating or cam-operating-release lever 179, thus withdrawing the dog 182 from the notch 176. Inasmuch as the shutter tensioning ring 124 engages the shutter leaf operating or cam ring 170 by means of the dog 175 cooperating with an opening 174, the said shutter leaf operating or cam ring 170 will be caused to make one fifth of a revolution or 72 degrees. As the cam formation 171 reaches the pin 172, the shutter leaf 173 will be caused to move about the hinge pin 191, and actually each of the leaves 173 of such shutter will so move. Each hinge pin 190 is attached to a shutter leaf support plate 192, shown in Fig. 26. The several shutter leaves 173 will have completely opened and closed during the travel of the shutter leaf operating or cam ring 170. The shutter grid plates or leaves will also have completely opened and closed during this cycle. The next notch 176 will now be engaged by the dog 182. The handle 125 of the shutter tensioning ring 124 will be positioned as shown in Fig. 21. As the said handle 125 of the tensioning ring 124 is turned in a clockwise direction, tensioning spring 157, until the said handle 125 reaches the limit of or near the limit of its motion, the next opening 174 of the shutter leaf operating or cam ring 170 will be engaged by the spring dog 175 of the shutter tensioning ring 124, and the shutter will now be in condition for a second exposure.

The shutter of the third embodiment of my invention is provided with a cover plate 193, best shown in Fig. 26, and the shutter leaf support plate 192 is provided with a cylindrical boss 194, Fig. 26, for supporting the front lens cell. The shutter housing 121 is provided with a cylindrical boss 195, Fig. 26, for supporting the rear lens cell. The said cover plate 193 is secured to the shutter housing 121 by screws 196 passing through holes in the shutter leaf support plate 192 and threaded into the shutter housing 121, as shown in Figs. 25 and 27. The said shutter intermediate plate 122 and the shutter leaf support plate 192 are held in proper position by means of bushings 198, shown in dotted lines in Figs. 21, 25 and 27.

The said third embodiment of my invention thus disclosed provides a shutter having both a high-speed grid and capping leaves, and thus no auxiliary means need be provided for capping the high-speed shutter when the grid shutter thereof is reset.

In describing the three embodiments of my invention herein shown, I have referred to three grid plates or leaves, one of which is stationary and two of which are movable. Within the broad scope and purpose of my invention, other number of shutter grid plates or leaves may be employed, but a two-grid plate or leaf obviously functions with less efficiency than a three-grid plate or leaf, because admitting only fifty per cent of the light, since the bars and the spaces must in such case be of equal cross sectional dimension and if a greater number of grid plates or leaves than three be provided, the grid bars thereof would necessarily be of such flimsy or delicate character as to render their use less desirable than the use of three grid plates or leaves which I have found in actual tests to prove entirely satisfactory. It will be evident from the illustration in the drawings, and particularly from Figs. 3, 4, 5, and also Figs. 22, 23, 24 and 25, that the bars of each shutter in cross sectional width are substantially less than the width of either opening next adjacent thereto. Therefore, when all the bars of all the grid plates overlie each other respectively, the shutter will provide an opening of more than fifty per cent for the passage of light through the lens.

The grid bars of the several grid plates or leaves may be arranged either upright or horizontal, or at any angle therebetween, within the scope of my invention. I have shown the grid bars horizontal in the first and third embodiments and I have shown them inclined in the second embodiment. While I have, in the three disclosed embodiments of my invention, shown one of the grid plates or leaves as always stationary, I may for some purposes, within the broad scope of my invention, make all the grid plates or leaves movable, as by entirely omitting the stationary leaf or plate, or moving it to and fro in substantially the same manner as the herein shown movable plates or leaves. I prefer, however, to employ a stationary grid plate or leaf as herein disclosed, without limiting myself thereto.

I have referred in the specification to the opening of the shutter in synchronization with the peak of the flash of the photo-flash lamp or bulb, as more particularly described and claimed in my co-pending divisional application Ser. No. 398,790, now Patent No. 2,308,725, dated January 19, 1943. I have in Fig. 30 diagrammatically indicated the light curve produced by a photo-flash lamp. I have plotted on the said curve the grid shutter opening of $\frac{1}{1000}$ second. The said diagram clearly indicates how the grid shutter herein disclosed makes possible the greatest amount of light passage to the lens of the camera at a speed of $\frac{1}{1000}$ second.

In the said several embodiments of my invention, I have disclosed means for practising a new art of high-speed photography, and by the use thereof photographs can be made when using the ordinary commercial and readily available photo-flash lamps to obtain speeds of $\frac{1}{1500}$ second, and at the same time securing fully timed negatives. I believe that I am the first to provide a camera shutter working near the nodal point of the lens to obtain speed anywhere near such value.

Having thus described three embodiments of the means or mechanism of my invention, I desire it to be understood that although specific terms are employed, they are used in a generic and descriptive sense and not for purposes of limitation, the scope of the invention being set forth in the following claims.

I claim:

1. In shutter mechanism for a photographic camera, and as means for obtaining ultra high-speed shutter effects through the use of two interconnected primary and secondary shutters synchronized in action and thereby with a primary shutter of normal speed and such interconnected secondary shutter obtaining a resultant combined shutter of materially higher speed than said primary shutter, the following elements: a primary photographic shutter and an interconnected secondary photographic shutter supported in close proximity thereto, said secondary shutter having a plurality of shutter plates occupying a face-to-face relation, each such plate of said secondary shutter being provided with a plurality of spaced, elongated bars alternating with, unobstructed, parallel openings, at least one of said plates being mounted in a stationary condition, and at least one of said plates having an operating formation, and operating means operatively connected for actuation thereof to the said primary shutter, and engaging said operating formation, thereby to impart bodily movement to one or more of such plates in said secondary shutter in a direction perpendicular to the lengthwise direction of the bars thereof, whereby the actuation of said primary shutter by said operating means to open and close said primary shutter causes by movement of one or more of said plates all of said spaced, parallel, unobstructed openings of the said plates of the secondary shutter to overlie each other while the said primary shutter is open, and immediately to move to closed position of said secondary shutter, thereby to obtain a resulting exposure, through the action of said combined shutter, that is materially faster than the exposure speed of said primary shutter, because of the opening and closing of the said secondary shutter plates while the primary shutter is operating to open and close.

2. Shutter mechanism in accordance with claim 1, but wherein said primary shutter is a between-the-lens shutter.

3. In shutter mechanism for a photographic camera, and as means for obtaining ultra high-speed shutter effects through the use of two interconnected primary and secondary shutters synchronized in action and thereby with such primary shutter of normal speed and such interconnected secondary shutter obtaining a resultant combined shutter of materially higher speed than said primary shutter, the following elements: a primary photographic shutter and an interconnected secondary photographic shutter supported in close proximity thereto, said secondary shutter having a plurality of shutter plates occupying a face-to-face relation, each such plate of said secondary shutter being provided with a plurality of spaced, elongated bars alternating with, unobstructed, parallel openings, and operating means operatively connected for actuation thereof to said primary shutter to actuate the same, thereby to impart bodily movement to one or more of such plates in said secondary shutter in a direction perpendicular to the lengthwise direction of the bars thereof, whereby the actuation of said primary shutter by said operating means to open and close said primary shutter causes, by movement of one or more of said plates, all of said spaced, parallel, unobstructed openings of the said plates of the secondary shutter to overlie each other while the said primary shutter is open and immediately to move to closed position of said secondary shutter, thereby to obtain a resulting exposure through the action of said combined shutter that is materially faster than the exposure speed of said primary shutter because of the opening and closing of the said secondary shutter plates while the primary shutter is operating to open and close.

4. A photographic camera having a between-the-lens shutter, a housing for said shutter, a cooperating grid shutter supported in said housing in close proximity to said between-the-lens shutter and of markedly higher speed than said between-the-lens shutter, said grid shutter consisting of a plurality of shutter grid plates having a face-to-face relation, each such grid plate being provided with spaced bars alternating with unobstructed spaces, at least one of said grid plates being mounted for movement in a direction transverse to the lengthwise extent of said bars to open and close said grid shutter at a higher speed than the exposure action of said between-the-lens shutter in opening and closing, said two shutters constituting a resultant combined shutter, and means at said housing and operatively connected to said grid shutter to cause movement, by said means, of at least one of said plates, thereby to cause all of the grid bars of the several plates thereof to overlie each other at a time when the between-the-lens shutter is open and immediately to move to the closed position of said grid shutter, thereby to obtain a resulting exposure through the action of said resultant combined shutter that is materially faster than the exposure speed of said between-the-lens shutter, due to the opening and closing of said grid shutter while the between-the-lens shutter is operating to open and close.

5. A combination according to claim 4, but wherein said means operatively connected to said grid shutter is also actuatingly connected to the release means for said between-the-lens shutter so as to effect the synchronizing action of said two shutters.

6. A combined between-the-lens shutter and grid shutter wherein the exposure is made by the grid shutter at the instant of complete opening of the leaves of the between-the-lens shutter, comprising a series of in and out movable between-the-lens shutter leaves, a plurality of grid leaves supported in face-to-face relation and each having spaced grid bars alternating with unobstructed spaces, at least one of said grid leaves being movable in a direction transverse to said unobstructed spaces, to open and close said grid shutter, and means to open and close all of the leaves of the said combined shutter in such time relation that exposure is made through the said grid shutter leaves while the bars thereof occupy respectively an overlying relation, and at the instant that said in-and-out movable leaves of the between-the-lens shutter are at their maximum opening in their opening and closing movement, thereby to obtain a resulting exposure through the action of said combined shutter that is materially faster than the exposure speed of said between-the-lens shutter, because of the opening and closing of said grid shutter while the between-the-lens shutter is operating to open and close.

7. In a photographic camera, a between-the-lens shutter having a grid shutter built therein, said grid shutter being positioned in close proximity to the lens shutter and having a plurality of grid plates in face-to-face relation, each such grid plate being provided with spaced bars alternating with unobstructed spaces, and of which grid plates at least one is mounted for movement in a direction transverse to the lengthwise extent of said bars, and operating means for said shutters co-relating in action the said between-the-lens shutter and the grid shutter to open and close both of said shutters, so that the leaves of the between-the-lens shutter are fully open during the period of opening and closing the grid shutter, thereby obtaining a resulting exposure through the said two co-related-in-action shutters that is materially faster than the exposure speed of said between-the-lens shutter, due to the opening and closing of said grid shutter while the leaves of the between-the-lens shutter are fully open.

8. In shutter mechanism for a photographic camera and as means for obtaining ultra-high-speed shutter effects through the use of two interconnected shutters synchronized in action and thereby, with a primary shutter of normal speed and such interconnected secondary shutter, obtaining a resultant combined shutter of materially higher speed than said primary shutter, the following elements in combination: a primary photographic shutter and an interconnected secondary photographic shutter supported in close proximity thereto, said secondary shutter having a stationary plate and also two oppositely movable plates, all supported in a face-to-face relation, each such plate of the secondary shutter being provided with spaced bars alternating with unobstructed spaces, operating means operatively connected to the primary shutter to actuate the same and operatively connected to said two movable plates to move said two movable in directions opposite to each other, transversely to their bars, to open and close said secondary shutter, whereby the actuation of said primary shutter by said operating means causes all of said unobstructed spaces of said two movable plates to overlie each other while said primary shutter is open.

9. A grid shutter assembly or attachment for application to a photographic camera, as to a face of the lens board thereof, comprising a mounting plate for application to said lens board and having a barrel portion receivable upon such lens board of the camera, three grid plates in face-to-face relation supported by said mounting plate to span the said barrel portion thereof, each such plate being provided with spaced bars alternating with unobstructed spaces, two of said grid plates being movable in a direction transverse to their bars to make an exposure, and said third plate being stationarily mounted, said movable grid plates being provided with opposite cam formations, a shutter setting ring supported on said mounting plate and having a pin-like formation to engage said opposite cam formations of said movable grid plates for moving said two grid plates to open and close such grid shutter, a spring supported at said mounting plate and connected to move said pin-like formation, and a release lever member carried by said mounting plate to engage releasably with said pin-like formation.

10. A grid shutter assembly or attachment for application to a photographic camera, as to a face of the lens board thereof, comprising a mounting plate for application to said lens board and having a barrel portion receivable upon such lens board of the camera, two grid plates in face-to-face relation supported by said mounting plate to span said barrel portion thereof, and each such plate being provided with spaced bars alternating with unobstructed spaces, said two grid plates being oppositely movable in directions transverse to their bars to make an exposure, said two grid plates being provided with opposite cam formations, a shutter setting ring supported on said mounting plate and having a pin-like formation to engage said opposite cam formations of said two grid plates for moving said two grid plates to open and close such grid shutter, a spring supported at said mounting plate and connected to move said pin-like formation, and a release lever member carried by said mounting plate to engage releasably said pin-like formation.

11. A grid shutter assembly or attachment for application to a photographic camera, as to a face of the lens board thereof, comprising a mounting plate for application to said lens board and having a barrel portion receivable upon such lens board of the camera, at least two grid plates in face-to-face relation supported by said mounting plate to span the said barrel portion thereof, each such plate being provided with spaced bars alternating with unobstructed spaces, one of said grid plates being a stationary plate and the other of said grid plates being movable in a direction transverse to the bars thereof to make an exposure, said movable grid plate being provided with a cam formation, a shutter setting ring supported on said mounting plate and having a pin-like formation to engage said cam formation of said movable plate for moving said movable plate to open and close such grid shutter, a spring supported at said mounting plate and connected to said pin-like formation, and a release lever member carried by said mounting plate to engage releasably said pin-like formation.

12. A grid shutter assembly or attachment for application to a photographic camera, as to a face of the lens board thereof, comprising a mounting plate for application to said lens board and having a barrel portion receivable upon such lens board of the camera, three grid plates in face-to-face relation supported by said mounting plate to span the said barrel portion thereof, each such plate being provided with spaced bars alternating with unobstructed spaces, two of said grid plates being movable in a direction transverse to their bars to make an exposure, and said third plate being stationarily mounted, said movable grid plates being provided with oppositely extending cam slots, a shutter setting ring supported on said mounting plate and having a pin-like formation to engage said oppositely extending cam slots of said movable grid plates for moving said two grid plates to open and close such grid shutter, a spring supported at said mounting plate and connected to move said pin-like formation, and a release lever member carried by said mounting plate to engage releasably said pin-like formation.

13. A grid shutter assembly or attachment for application to a photographic camera, as to a face of the lens board thereof, comprising a mounting plate for application to said lens board and having a barrel portion receivable upon such lens board of the camera, three grid plates in face-to-face relation supported by said mounting plate to span the barrel portion thereof, each such plate being provided with spaced bars alternating with unobstructed spaces, two of said grid bars being movable in a direction transverse to their bars to make an exposure, and said third plate being stationarily mounted, said movable grid plate being provided with opposite cam slots, and said stationary plate being provided with a correspondingly located clearance slot, a shutter setting ring mounted on said mounting plate for limited turning movement thereon and having an operating pin extending into said cam slots and through said clearance slot of the stationary plate for moving said two grid plates to open and close such grid shutter, a release lever mounted on said mounting plate and having a release dog to engage a release pin, a coiled spring wrapped partly about the barrel portion of said mounting plate and attached to said mounting plate and to such release pin.

14. A grid shutter assembly or attachment for application to a photographic camera, as to a face of the lens board thereof, comprising a mounting plate for application to said lens board and having a barrel portion receivable upon such lens board of the camera, three grid plates in face-to-face relation supported by said mounting plate to span the said barrel portion thereof, each such grid plate being provided with spaced bars alternating with unobstructed spaces, two of said grid plates being movable in a direction transverse to their bars to make an exposure, and said third plate being stationarily mounted, said movable grid plates being provided with operating formations, a shutter setting ring supported on said mounting plate and having an operating formation to engage the said operating formations of said movable grid plates for moving said two movable grid plates to open and close such grid shutter, a spring supported at said mounting plate and connected to move said operating formation, and a release lever member carried by said mounting plate to engage releasably said operating formation.

15. A grid shutter assembly or attachment for application to a photographic camera, as to a face of the lens board thereof, comprising a mounting plate for application to said lens board and having a barrel portion receivable upon such lens board of the camera, two grid plates in face-to-face relation supported by said mounting plate to span said barrel portion thereof, each such plate being provided with spaced bars alternating with unobstructed spaces, said two grid plates being oppositely movable in a direction transverse to their bars to make an exposure, said movable grid plates being provided with operating formations, a shutter setting ring supported on said mounting plate and having an operating formation to engage the said operating formations of said movable grid plates for moving said two movable grid plates to open and close such grid shutter, a spring supported at said mounting plate and connected to move said operating formation, and a release lever member carried by said mounting plate to engage releasably said operating formation.

16. A grid shutter assembly or attachment for application to a photographic camera, as to a face of the lens board thereof, comprising a mounting plate for application to said lens board and having a barrel portion receivable upon such lens board of the camera, two grid plates in faceto-face relation supported by said mounting plate to span said barrel portion thereof, each such plate being provided with spaced bars alternating with unobstructed spaces, said two grid plates being oppositely movable in a direction transverse to their bars to make an exposure, said movable grid plates being provided with operating formations, a shutter setting member supported for opposite turning movement at said mounting plate and having an operating formation to engage said formations of said grid plates for moving said grid plates to open and close the same, and a release lever member carried at said mounting plate to engage releasably said operating formation of the said shutter setting member.

17. A combined, interconnected, normal speed, between-the-lens shutter and built-in grid shutter wherein the exposure is made by the grid shutter at the instant of complete opening of the leaves of such normal-speed between-the-lens shutter, thereby obtaining ultra-high-speed shutter effects by the use of such between-the-lens shutter of normal speed and said interconnected built-in grid shutter, said structure comprising a combined shutter housing for both said shutters, shutter leaves of such between-the-lens shutter pivoted in said housing for in and out swinging exposure movement, a pair of oppositely movable grid plates also mounted in said housing in close parallelism to said shutter leaves, each such grid plate being provided with spaced bars alternating with unobstructed spaces, and operating means for both said shutters mounted in said housing to move oppositely said plates in directions transverse to said spaced bars to open and to close the said spaces of said grid plates at a higher speed than the exposure action of said between-the-lens shutter in opening and closing the leaves thereof and while the between-the-lens shutter is operating to open and close.

18. A structure according to claim 17, but wherein said operating means includes a shutter leaf-operating cam ring with which formations of said shutter leaves engage, and also includes a tensioning ring engaging said grid plates to move them oppositely, and also actuating said cam ring, said cam ring and said tensioning ring being in close parallel proximity in said housing.

19. A structure according to claim 17, but wherein there is interposed between said two movable grid plates a stationary grid plate having similar spaced bars with intervening unobstructed spaces.

20. A combined, interconnected, normal speed, between-the-lens shutter and built-in grid shutter, wherein the exposure is made by the grid shutter at the instant of complete opening of the leaves of such normal-speed between-the-lens shutter, thereby obtaining ultra-high-speed shutter effects by the use of such between-the-lens shutter of normal speed and said interconnected built-in grid shutter, said structure comprising a combined shutter housing for both said shutters, shutter leaves of such between-the-lens shutter pivoted in said housing for in and out swinging exposure movement, a pair of grid plates also mounted in said housing in close parallelism to said shutter leaves, each such grid plate being provided with spaced bars alternating with unobstructed spaces, one of said grid plates being stationarily mounted in said housing and the other grid plate being mounted in said housing for movement transverse to its bars, and operating means for both said shutters mounted in said housing to move said movable grid plate in said directions transverse to its bars to open and to close said spaces of said grid plates at a higher speed than the exposure action of said between-the-lens shutter in opening and closing the leaves thereof and while the between-the-lens shutter is operating to open and close.

21. A structure according to claim 17, but wherein said operating means includes a shutter-leaf-operating cam ring with which formations of said shutter leaves engage, and also includes a tensioning ring engaging said grid plates to move them oppositely, and also actuating said cam ring, said cam ring and said tensioning ring being in close parallel proximity in said housing, and wherein said tensioning ring has cam formations that engage said grid plates to move them oppositely and a spring is provided to turn said tensioning ring in one direction.

22. In shutter mechanism for a photographic camera, a plurality of shutter plates or leaves having a face-to-face relation, each such plate or leaf being provided with a plurality of spaced, elongated, parallel openings with bars between said openings, the bars of each plate or leaf having a combined width which is less than the combined width of the openings thereof, at least one of said plates or leaves being mounted in a stationary condition, and at least two of said plates or leaves having a cam formation, and operating means to engage said cam formations, thereby to impart bodily movement to at least two of such plates in a direction perpendicular to the lengthwise direction of the openings thereof, so as to open and close said shutter.

23. In shutter mechanism for a photographic camera, a plurality of shutter grid plates having a face-to-face relation, each being provided with a plurality of spaced, elongated openings with bars between said openings, each such bar having a cross sectional width which is less than the cross sectional width of the opening at either side thereof, so that when all the bars of the shutter are in respective superposed position, the shutter will provide more than fifty per cent opening for the passage of light through the lens, at least one of said grid plates being mounted in a stationary condition and at least two of said grid plates each having a cam formation and operating means to engage said cam formations, thereby to impart bodily movement to at least two of such grid plates in a direction perpendicular to the lengthwise direction of the openings thereof to open and close such grid shutter.

24. In shutter mechanism for a photographic camera, for the purpose of passing a maximum amount of light therethrough, a plurality consisting of at least three shutter grid plates all having a face-to-face relation and including two movable grid plates, each provided with a plurality of spaced, elongated, parallel openings with flat bars between said openings, the cross-sectional width of each bar being less than the cross sectional width of each adjacent space throughout all of said grid plates, so that when the said bars of all the grid plates are superposed, the unobstructed spaces thereof constitute more than one-half of the total area inside the bounding rims of said grid plates; at least one of said grid plates being stationarily mounted, and at least two of said grid plates each having an operating formation, and operating means to engage said formations and to impart bodily movement oppositely to said two movable grid plates in a direction perpendicular to the lengthwise direction of the said openings, thereby to open and to close the said grid shutter.

25. In shutter mechanism for a photographic camera, for the purpose of passing a maximum amount of light therethrough, a plurality consisting of at least three shutter grid plates, all having a face-to-face relation and including two movable grid plates, each grid plate being provided with a plurality of spaced, elongated, parallel openings with flat bars between said openings, the cross-sectional dimensions of all of the bars of each such plate being less than the cross sectional dimension of all said openings of such plate, and such dimension of each bar being less than such dimension of the adjacent opening at either side of such bar; at least one of said grid plates being stationarily mounted, and at least two of said grid plates each having an operating formation, and operating means to engage said formations and to impart bodily movement to said two movable plates in a direction perpendicular to the lengthwise direction of the said openings, thereby to bring all of said bars into superposition to open the shutter and then into a position in which each of said openings is overlapped by two bars jointly of two other plates, thereby closing the said grid shutter.

26. A shutter mechanism in accordance with claim 25, but in which the operating formations of two grid plates consist of oppositely positioned cams, and in which the operating means acting upon said oppositely positioned cams moves said two grid plates oppositely to each other to open and to close said grid shutter.

27. In shutter mechanism for a photographic camera, for the purpose of passing a maximum amount of light therethrough, a plurality consisting of at least three shutter grid plates, all having a face-to-face relation and including two movable grid plates, each grid plate being provided with a plurality of spaced, elongated, parallel openings with flat bars between said openings, the cross sectional dimension of all of the bars of each such plate being less than the cross-sectional dimension of all said openings of such plate, and such dimension of each bar being less than such dimension of the adjacent opening at either side of such bar; at least one of said grid plates being stationarily mounted, and operating means cooperating with two of said grid plates to move them oppositely to each other to open and to close said grid shutter.

28. In a photographic camera, a primary shutter and a secondary shutter supported in close proximity and which together constitute a resultant combined shutter of materially faster exposure speed than the exposure speed of said primary shutter; operating means operatively connected to said primary shutter to actuate the same to open and close, so as, by such act of opening said primary shutter, to open and close said secondary shutter while said primary shutter is fully open; said secondary shutter having a plurality of shutter plates occupying a face-to-face relation, each such plate of said secondary shutter having a series of elongated bars with unobstructed openings therebetween; said operating means acting to impart movement to one or more of the said plates of said secondary shutter in a direction transverse to the lengthwise extent of said bars thereof, so as to cause all the said openings of the said plates of the secondary shutter respectively to overlie each other, and all of said bars of said plates respectively to overlie each other while said primary shutter is fully open, and immediately to move to the closed position of such secondary shutter, whereby said materially faster exposure speed of the resultant combined shutter is obtained.

29. In shutter mechanism for a photographic camera, a stationary plate and two oppositely movable plates, all in a face to face relation, and all of which plates are provided with spaced bars alternating with unobstructed spaces, a supporting housing for all said plates and provided with a cover plate also having spaced bars, and means supported by said housing to move said movable plates in directions opposite to each other, transversely to their bars, so as to open and close the shutter.

30. In shutter mechanism for a photographic camera, a stationary plate and two oppositely movable plates, all in a face to face relation, and all of which plates are provided with spaced bars alternating with unobstructed spaces, a supporting housing for all said plates and provided with a cover plate also having spaced bars alternating with unobstructed spaces, a spring-tensioned ring supported upon said housing and having means to engage the movable plates, to impart opening and closing movements to them transversely to said bars.

31. In shutter mechanism for a photographic camera, a stationary plate and two oppositely movable plates, all in a face to face relation, and all of which plates are provided with spaced bars alternating with unobstructed spaces, a supporting housing for all said plates and provided with a cover plate also having spaced bars, a spring-tensioned ring mounted upon said housing for opposite, rotative movement and having handle means for manual operation of the shutter, and also having a projecting operating pin, the said movable plates having cam slots oppositely positioned with respect to each other and receiving said operating pin, whereby movement of said ring in opposite directions oppositely moves said plates transversely to their bars to open and to close the shutter.

32. In shutter mechanism for a photographic camera, a stationary plate and two oppositely movable plates, all in a face to face relation, and all of which plates are provided with spaced bars alternating with unobstructed spaces, a supporting housing for all said plates and provided with a cover plate also having spaced bars, a spring-tensioned ring mounted upon said housing for opposite rotative movement and having handle means for manual operation of the shutter, and also having a projecting operating pin, the said movable plates having cam slots oppositely positioned with respect to each other and receiving said operating pin for moving said plates transversely to their bars, and a shutter release member supported by the housing to hold the shutter in closed set position.

33. A combination according to claim 32, but in which the shutter release member is a spring pressed lever which when released permits the said ring to be turned by its spring to open and to close the shutter.

34. In shutter mechanism for a photographic camera, three shutter plates or leaves having a face to face relation and each provided with spaced bars alternating with unobstructed spaces, one of said plates being stationarily mounted, the other two plates being movable to open and close the shutter, said two movable plates having oppositely positioned operating slots and the stationary plate having an arcuate slot, and a spring tensioned operating member supported by the shutter mechanism for opposite movements and having an operating pin received in all of said slots for moving said plates transversely to their bars.

35. A combination according to claim 34, but in which the movable plates are themselves provided with guiding slots.

36. A grid shutter attachment or assembly for application to a photographic camera for use in conjunction with the between-the-lens shutter thereof, comprising a mounting plate having a tubular portion receivable upon the barrel of the between-the-lens shutter of such camera, said attachment or assembly having three shutter plates or leaves having a face to face relation and each provided with spaced bars alternating with unobstructed spaces, one of said plates being stationarily mounted on said plate, the other two plates being movable transversely of said tubular portion thereto to open and close the said grid shutter, operating means to engage said two movable plates and move them oppositely to each other transversely to their bars, to open and close the grid shutter, so that such grid shutter is operated to make an exposure when the leaves of the between-the-lens shutter are open because of being set by the setting means when the grid bars are in non-superposed relation, and then released to permit an exposure through the open leaves of such between-the-lens shutter.

37. A combination according to claim 36, but in which the housing is provided at the front thereof with a fixed grid bar member, closely adjacent the outermost movable plate or leaf.

38. A structure according to claim 4, but in which the said between-the-lens shutter is provided with a setting lever-like member operatively connected to the said movable grid plate or plates, whereby the movement of said lever-like member to set the between-the-lens shutter closes the said shutter grid openings 39. In a photographic camera, a between-the-lens shutter having a grid shutter built therein, said grid shutter being positioned in close proximity to the lens shutter and having a plurality of grid plates in face-to-face relation, and each provided with spaced bars alternating with unobstructed spaces, and of which grid plates at least one is mounted for movement in a direction transverse to the lengthwise extent of said bars, and means for co-relating in action the said between-the-lens shutter and the grid shutter, so that the leaves of the between-the-lens shutter are fully open during the period of opening and closing the grid shutter thereby obtaining a resulting exposure through the said two co-related-in-action shutters that is materially faster than the exposure speed of said between-the-lens shutter, due to the opening and closing of said grid shutter while the leaves of the between-the-lens shutter are fully open, the said co-relating means including a cam ring movable in one direction to open and to close the leaves of the between-the-lens shutter, and a tension spring to operate said cam ring.

40. A combination according to claim 39, but in which the said ring has a spring dog to turn said ring in one direction and a handle to turn it in the opposite direction.

41. A combination according to claim 39, but wherein there is provided a tension ring with a cam formation or formations, and there are also provided operative connections to the movable grid plate or plates of the grid shutter.

42. A photographic camera having a between-the lens shutter, a housing for said shutter, a grid shutter supported in said housing and consisting of a plurality of shutter grid plates having a face-to-face relation, each such grid plate being provided with spaced bars alternating with unobstructed spaces, at least one of said grid plates being mounted for movement in a direction transverse to the lengthwise extent of said bars, and a shutter tension ring supported for turning movement within said housing and operatively connected to said grid shutter to operate the same by such turning movement, to cause all the grid bars of the grid shutter to overlie each other at a time when the between-the-lens shutter is open and immediately to move to the closed position of said grid shutter, thereby to obtain a resulting exposure, through the action of such resultant combined shutter, that is materially shorter than the exposure speed of said between-the-lens shutter, due to the opening and closing of said grid shutter while the between-the-lens shutter is operating to open and close.

43. A photographic camera according to claim 42, but wherein the tension ring and the movable grid plate or plates have interengaging formations for operating such grid plate or plates by turning movement of said tension ring.

44. A photographic camera according to claim 42, but wherein said tension ring and the said movable grid plate or plates have interengaging formations for operating the same by turning movement of said tension ring, and wherein there is provided a leaf operating cam ring for the leaves of the between-the-lens shutter, said cam ring also being supported within said housing.

45. A photographic camera according to claim 42, but wherein said tension ring and said movable grid plate or plates have interengaging formations for operating the grid plate or plates by turning movement of said tension ring, and wherein there is provided a leaf operating cam ring for the leaves of the between-the-lens shutter, also supported within said housing, and wherein there is also provided means to move said cam ring in one direction only, thereby to impart opening and closing movements to the leaves of the between-the-lens shutter, whereby the grid bars of the grid shutter overlie each other at a time when the between-the-lens shutter is open.

46. A combined between-the-lens shutter and grid shutter wherein the exposure is made by the grid shutter at the instant of complete opening of the leaves of the between-the-lens shutter, comprising a series of in and out movable between-the-lens shutter leaves, a plurality of grid leaves supported in face-to-face relation and each having spaced grid bars alternating with unobstructed spaces, two of said grid leaves being oppositely movable transverse to the lengthwise extent of said bars in making exposures, and means to operate all of the movable leaves of the combined shutter in such timed relation that exposure is made through the said grid leaves while occupying an overlying relation at the instant the said in-and-out movable leaves of the between-the-lens shutter are at their maximum opening in their opening and closing movement, thereby to obtain a resulting exposure, through the action of said combined shutter, that is materially faster than the exposure speed of said between-the-lens shutter, because of the opening and closing of said grid shutter while the between-the-lens shtuter is operating to open and close.

47. A combination according to claim 46, but in which all of said parts are mounted in juxtaposition within a single housing.

48. A combination according to claim 46, but in which a cam ring operatively connected to said in-and-out movable leaves and a shutter tensioning ring operatively connected to said grid leaves are provided.

49. A combination according to claim 46, but in which a cam ring operatively connected to said in-and-out movable leaves and a shutter tensioning ring operatively connected to said grid leaves are provided, and a coiled spring is provided to turn said tensioning ring in one direction.

50. A combination according to claim 46 in which the means to operate the grid leaves includes a tension ring having cam formations operatively related to such grid leaves.

OSCAR STEINER.